INVENTOR.
CHARLES BANCROFT
BY
ATTORNEYS

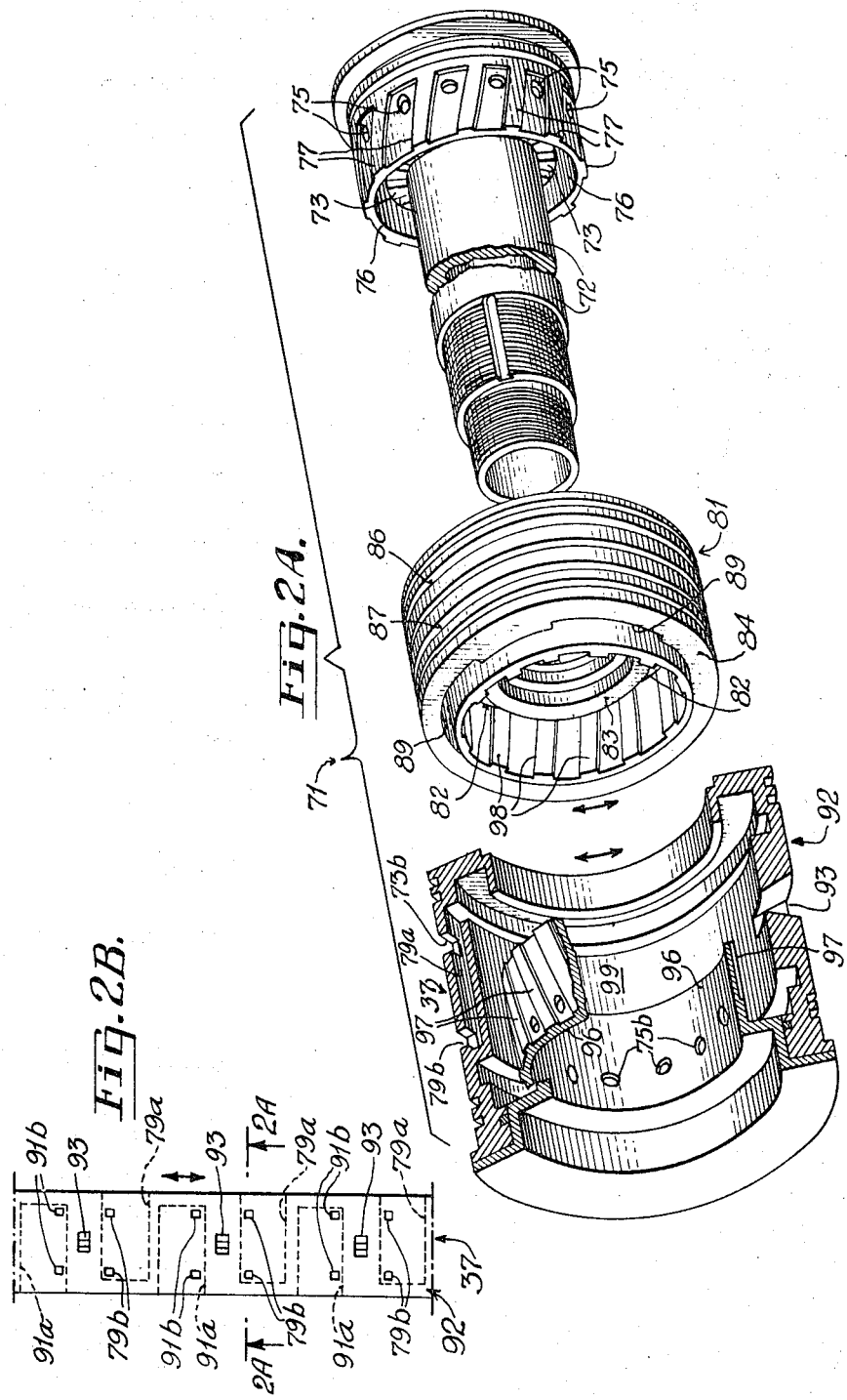

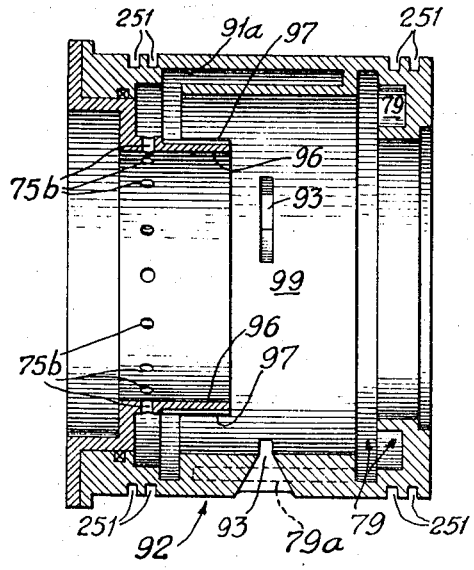
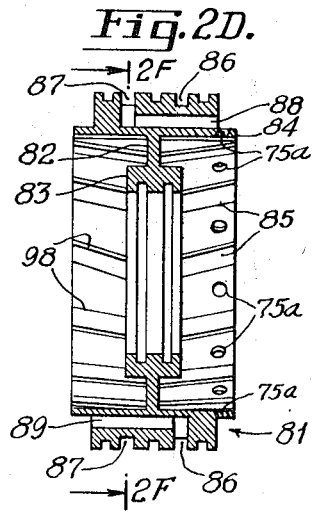
Fig.2D.
Fig.2C.
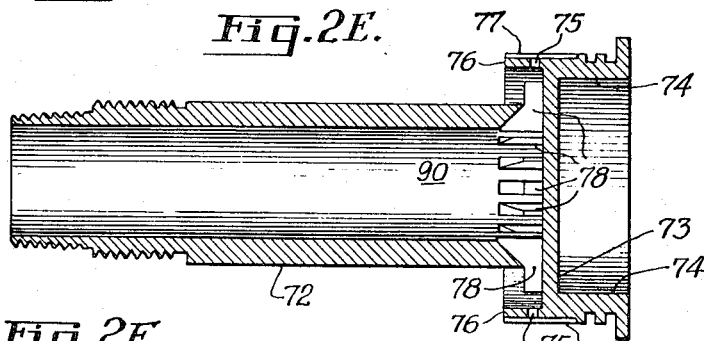
Fig.2E.
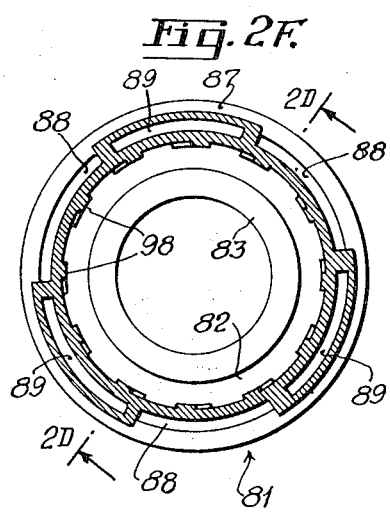
Fig.2F.

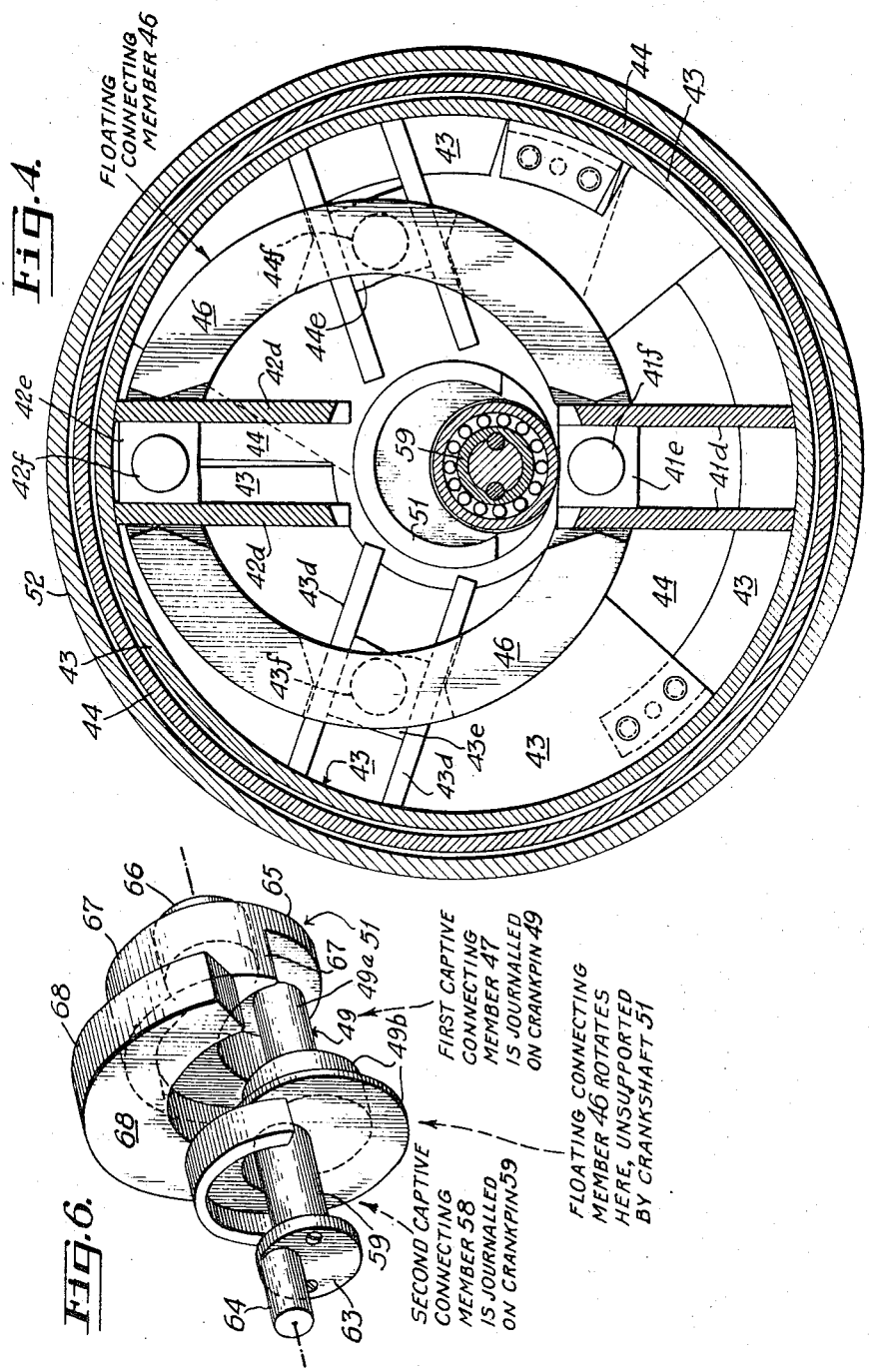

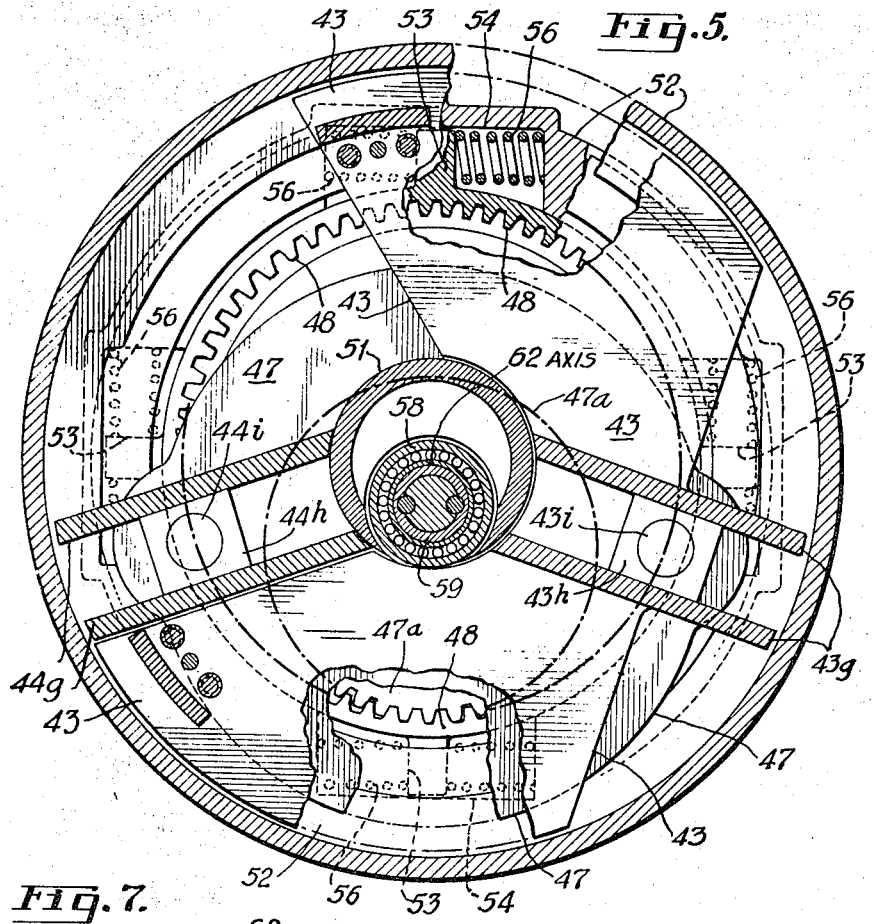
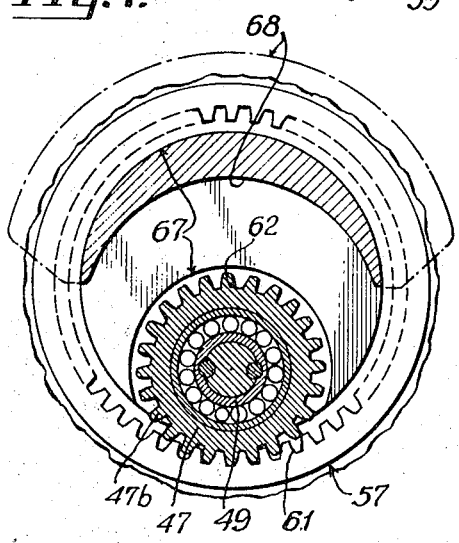

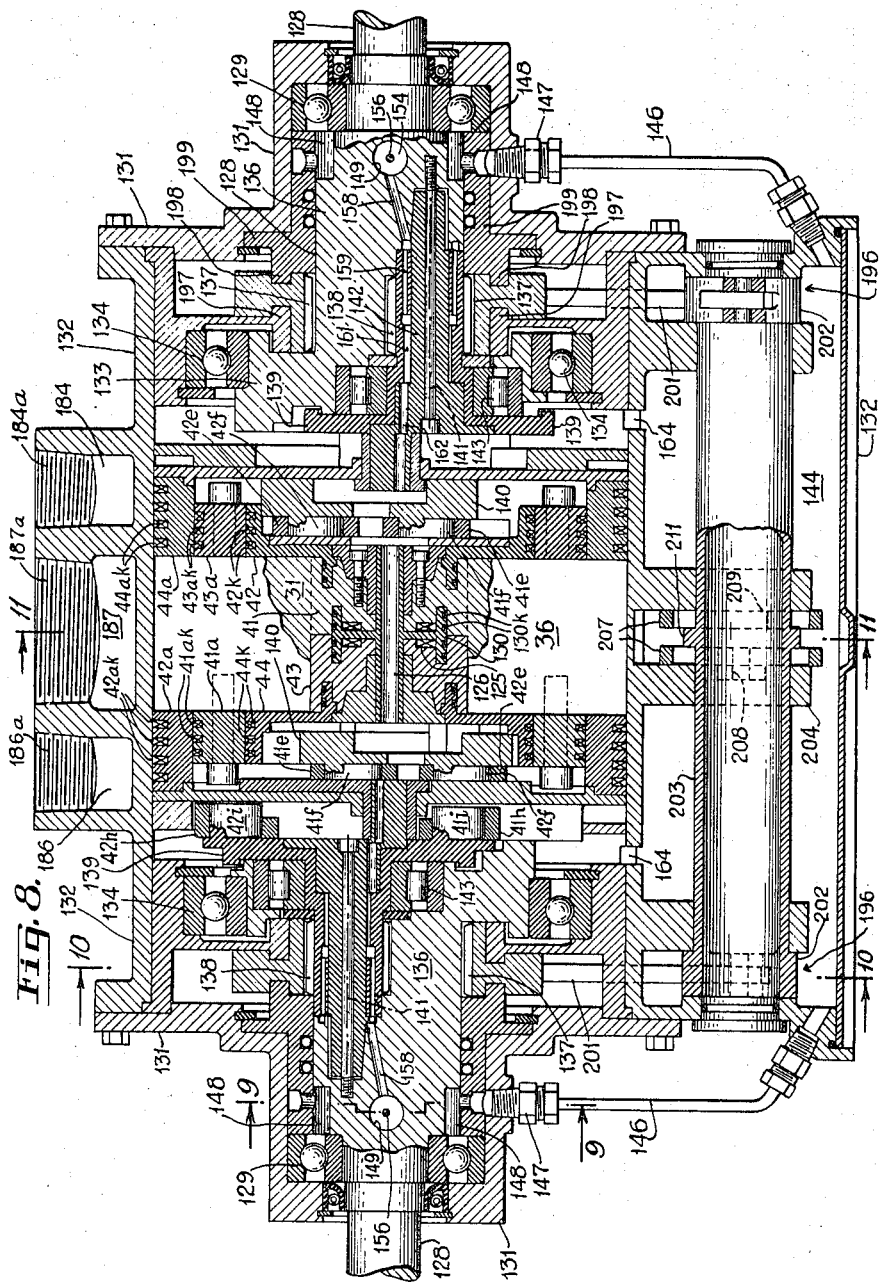

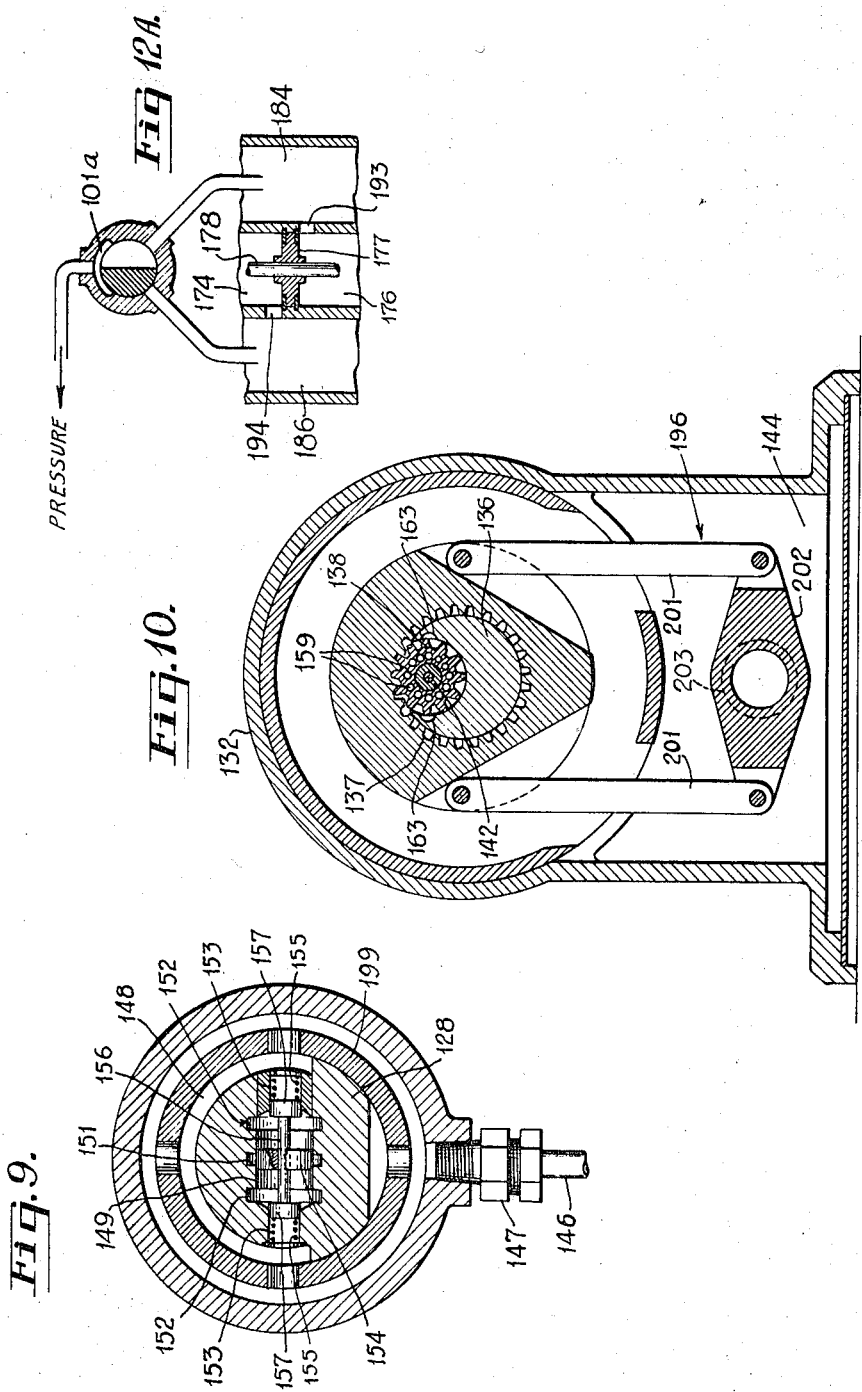

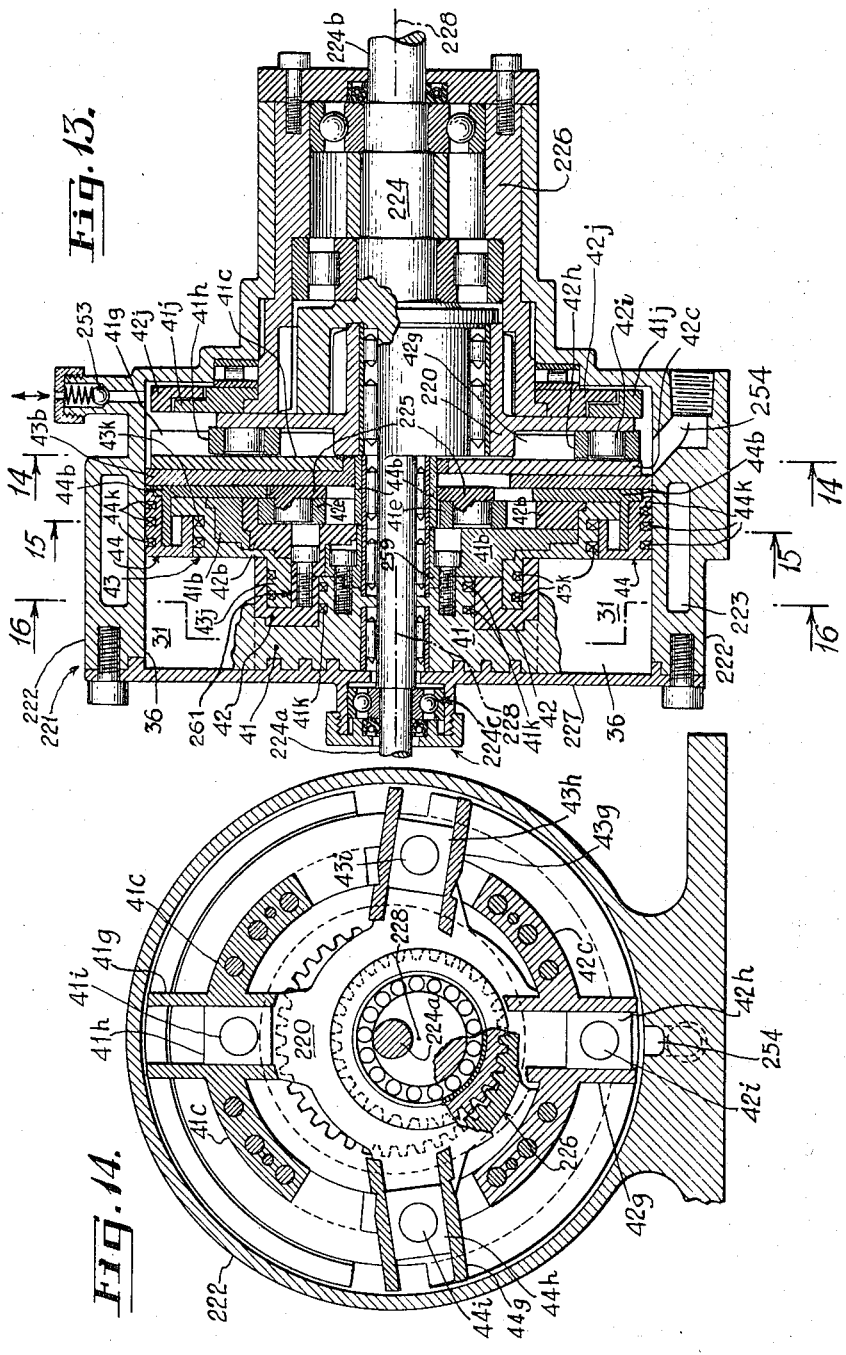

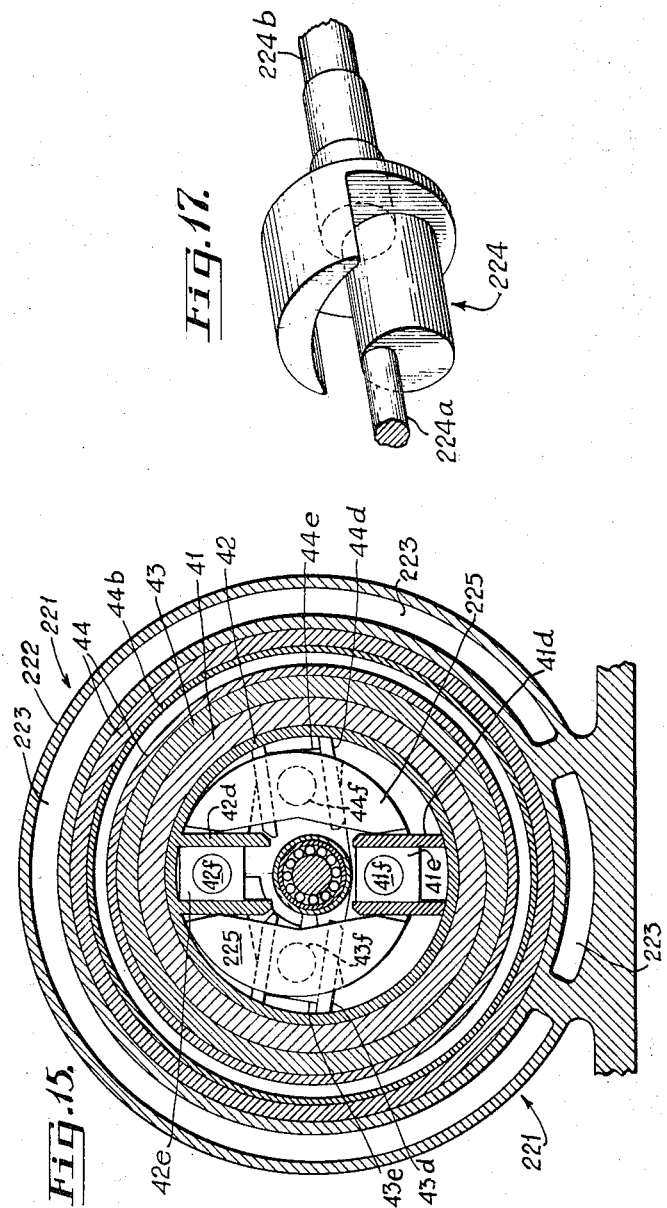

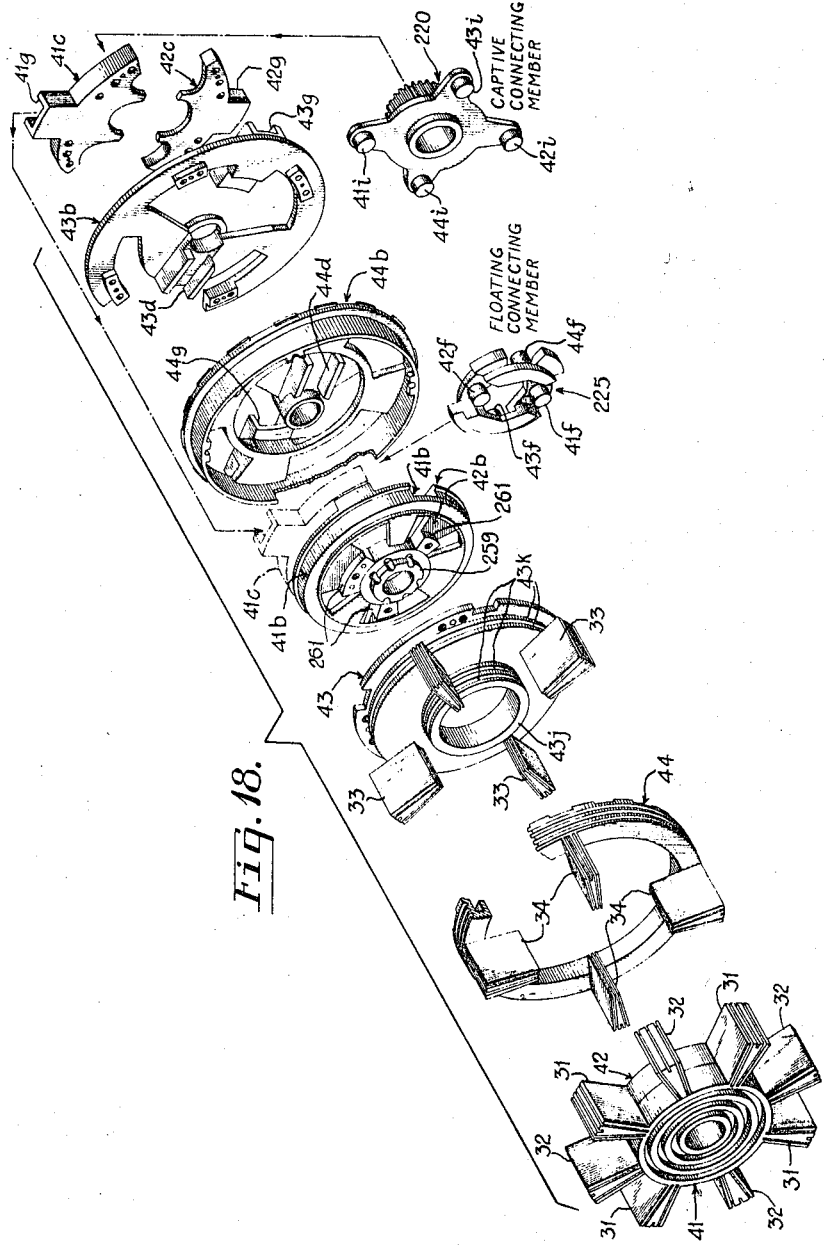

3,555,813
Patented Jan. 19, 1971

3,555,813
ROTARY PISTON DEVICES
Charles Bancroft, 178 Ferris Hill Road,
New Canaan, Conn. 06840
Original application Aug. 5, 1968, Ser. No. 750,084.
Divided and this application Nov. 21, 1969, Ser.
No. 878,773
Int. Cl. F01k 23/00; F04c 1/00; F02b 53/00
U.S. Cl. 60—11                                                    9 Claims

ABSTRACT OF THE DISCLOSURE

A self-contained power system particularly suitable for use as a vehicle drive system consisting of a self-powered and self-regulating gas generator of the rotary piston type delivering hot compressed gas for any desired purpose, such as the powering of compressed gas motors which may also be of the rotary piston type, capable of individually driving each wheel of a vehicle. Both the compressed gas motors and the gas generator incorporate rotating sets of vane pistons moving in an annular chamber, and alternately accelerating and decelerating while moving around the annular chamber. The rotating sets of accelerating and decelerating pistons are controlled by their engagement with connecting members mounted for planetary orbital rotation within the stator housings of these devices. At least one of these connecting members is engaged with at least one central crankshaft for controlling this orbital rotation and delivering torque to or from the device, while one or more other connecting members are "floating" connecting members engaged only with the piston sets, and not connected directly with other connecting members or crankshafts or with the stator housing. The gas generator incorporates a unique compressed gas bleed feature providing self-regulating operation for efficient delivery of compressed gas at a predetermined pressure level. The compressed gas motor devices incorporate simple reversing means and means for automatic adjustment of port openings and closings for most efficient operation at any given pressure, as well as simple speed reducer means functioning to reduce the high rotational velocity of the crankshafts in these gas motors to more useful output velocities for such purposes as driving the wheels of a moving vehicle. Other useful features of these rotary piston devices include positive lubrication means for drawing oil from an oil sump during operation, splashing it over the moving parts during operation, but returning it to a sump in which it is retained when the device is not in operation.

RELATED APPLICATION

This application is a divisional application divided from my parent application entitled "Rotary Piston Devices," Ser. No. 750,084, filed Aug. 5, 1968.

BACKGROUND OF THE INVENTION

Rotary piston engines, compressors, pumps and motors have been described in numerous patents such as Bullington U.S. Pat. 1,497,481 and the present inventor's U.S. Pats. 2,061,131; 2,132,596; 2,155,249; 2,228,193; 2,248,-484; 2,270,493; 2,544,480; 2,544,481; 2,553,954; 2,810,-371; 2,852,007; 2,971,500 and 3,241,531. The basic structural components of these rotary piston engines are incorporated in the devices of the present invention, including an annular chamber formed in the stator housing within which several sets of vane pistons are positioned for rotation, being mounted on annular or tubular sleeves or piston support members securing all pistons of each set in their predetermined angular positions, each equally spaced from the other pistons of that set around the periphery of the chamber. The pistons of successive different piston sets are successively interposed, proceeding around the annular chamber, and are anchored to individual support plates or tubular sleeves, preferably interfitting with each other to form labyrinth seals retaining compression and combustion pressures within the sectors of the annular chamber defined by its walls and the facing surfaces of the vane pistons. The support members or tubular sleeve units preferably form portions of the walls of the annular chamber, with their tolerances and clearances being minimum for successful mechanical operation, and being selected to minimize leakage of any compressed gas from the chamber, with any such gas leakage behind these chamber walls being controlled to equalize pressure on them and to control oil consumption. As described in my Pats. 2,061,131, 2,155,249 and 2,544,-480, the changing acceleration and deceleration of the piston sets produced by the varying angular relationships between these piston sets and the crankshaft of the device depend upon connecting members rotatably mounted upon offset crankpins of the crankshaft and provided with pinion gear means engaging a stationary ring gear to produce rotation of the connecting member in a direction contrary to that of the crankshaft. These connecting members are provided with integral pivot pins on which are journaled "pillow blocks" or "crosshead bearing blocks" in sliding engagement with radial tracks or guideway slides formed on radial flange portions of the support members of each piston set. In this manner the "internal rolling motion" of the connecting member within the stator-mounted stationary ring gear produces an "epitrochoid" or "hypotrochoid" curve about the maximum radial locus of these pivoting pins. The angular acceleration and deceleration of the connecting member pins as they follow this path are transmitted by these radial guideways directly to the piston sets, producing corresponding angular acceleration and deceleration of the piston sets according to a predetermined pattern. The rolling engagement of the connecting members with the stator may be provided either by pinion-internal ring gear assemblies, or by "trammel gear" means as described in my Pat. 3,241,531, and illustrated in FIG. 6 thereof by a lobed member 92d engaging a lobed track 98a, effectively forming a gear substitute. The successive corresponding positions of a connecting member 52 and several sets of vane pistons engaged therewith are shown in my Pat. 2,061,131 at FIGS. 15 through 22, and in my Pat. 2,155,249 at FIGS. 11 through 23.

These rotary piston devices provide exceptional displacement for a given size and weight of engine, since the approaching pistons may be moved into face-to-face contact with each other, and may then be separated by large angular distances; the overlapping of these angular distances during successive expansion strokes of successive sets of vane pistons provides a volume substantially larger than the volume of the annular chamber swept by the piston sets. For this reason, such devices may have very high volumetric efficiency and large displacement for a given size, limited only by the normal problems of pressure fluid sealing, dynamic balancing and lubrication against sliding friction encountered in all rotating machinery. In order to take advantage of these features while providing solutions to the practical problems, the present invention incorporates a number of useful innovations.

In addition to connecting members mounted on a crankpin of a central crankshaft, the devices of the present invention incorporate "floating" connecting members not engaged with the stator housing, and positioned only by their pivot pin connections to the piston set support members or tubular sleeves. Because of these connections to the piston sets, these floating connecting members are forced to follow a path of movement as if they each were mounted on a non-existent "phantom" crankpin, but they are otherwise free to move without reference to crankshafts or bearings. By being supported in this manner, these "floating" connecting members eliminate mechanical interferences which would otherwise make the construction too weak or too bulky to be practical. Since the connecting members have an orbital rotation around the axis of the engine, as well as their rotation on their own axes, the centrifugal forces produced by this orbital motion counteract the inertia produced by acceleration and deceleration of the piston sets in their rotation, and if desired, it is therefore possible to balance the centrifugal forces generated by the orbital movement of the connecting members against the piston inertias, by selective control of the weight of the connecting members. Such balance greatly reduces frictional losses and wear in the operation of the engine, and reduces the dynamic loads applied to the bearing structures provided elsewhere in the device.

In the self-powered gas compressor or gas generator devices of the present invention, the use of an induction blower or supercharger permits a portion of atmospheric air being compressed in the device to be delivered through bleed valves while still retaining sufficient air for powerstroke purposes. The remaining atmospheric air, further compressed, is mixed with fuel and ignited in the firing chambers. The pressure in this air bleed conduit can be adjusted by spring-loaded, variable pressure regulator valves. The firing chambers are preferably positioned at the periphery of the annular piston chamber, angularly spanning the top dead center dwell positions of the forward piston of the pairs of pistons compressing the charge, and thus conduct the compressed and ignited fuel-air mixture past the top dead center pistons to the spaces ahead of them, to provide added impetus to the next vane pistons already accelerating rapidly forward away from top dead center position. In addition, these gas generator devices may incorporate a supplementary compressed air bleed conduit for diverting a portion of the output compressed air from the gas generator around the firing chambers to downstream positions where the ignited charges have already expanded to a lower intermediate pressure. Here the extra compressed air is expanded by the heat of the ignited charge while reducing the temperature to provide additional driving torque, and a cooler generator and cleaner exhaust.

Since the selected delivery pressure of the compressed air bled from the gas generator prior to combustion, determined by the adjustable regulator valve, will control the amount of air remaining in the gas generator for combustion, this provides partially automatic control of the torque driving the gas generator, inasmuch as the higher the bleed or back pressure, the more air remains within the firing chamber to provide the additional driving torque required to compress the delivered gas to the desired higher delivery pressure. This automatic degree of self-regulation of the gas generator can be assisted or supplemented by controlling the fuel intake of the generator in the manner usually employed to throttle internal combustion engines.

In the gas generator devices of this invention, the variably adjustable regulator check valves inserted in the compressed gas delivery conduit tapping the annular chamber at the points where the atmospheric air is partially compressed serve to establish a minimum pressure below which air will not be bled from the generator so that the generator will not be stalled by too-complete bleeding of the compressed air from the generator at these points, which would leave insufficient air to provide adequate power strokes to maintain the device in operation.

The compressed gas motors of this invention are well adapted for uses such as in driving vehicles which present widely varying torque requirements with positive speed control, both because they are easily reversed with a minimum of mechanism, and because they provide small compact units delivering tremendous amounts of torque smoothly and efficiently at varying pressure. These compressed gas motors employ easily reversible valve assemblies connecting the predetermined angularly displaced zones around the periphery of the annular chamber to pressure and to exhaust respectively. Two embodiments of these compressed gas motors are shown in the drawings. In one, porting control for selecting the direction of rotation and for improving operating efficiency is incorporated in the outer wall of the annular vane piston cylinder, while in the other, these ports are incorporated in the inner wall of the annular cylinder, and this latter embodiment is considered to be the preferably one for driving the individual wheels of a vehicle. In addition, these compressed gas motors preferably incorporate speed reducer assemblies connecting their rotary vane piston sets via the connecting members to the output crankshafts to provide driving torque at practical rotational speeds for vehicle propulsion.

OBJECTS OF THE INVENTION

Accordingly, a principal object of the invention is to provide a practical power source, including power generation means and power transmission means, incorporating a gas generator and gas motors.

Another object of the invention is to provide a vehicle drive system incorporating automatic torque conversion and including a gas generator and a separate gas motor for each driven axle or wheel.

A further object of the invention is to provide such systems incorporating highly compact compressed gas generators and motors of a rotary piston type.

A further object of the invention is to provide a combination of gas generator and compressed gas motors in which each motor's direction of rotation is governed solely by the direction of flow of compressed gas through that motor.

Another object of the invention is to provide such systems incorporating easily reversed compressed gas motors, capable of operating efficiently over a range of varying pressures.

A further object is to provide rugged, durable devices of the rotary piston type with high power output for small size.

Another object is to provide such systems incorporating rotary piston devices with sets of pistons connected by "floating" connecting members serving to balance centrifugal forces against inertia forces reducing friction, stress and deformation of the parts of the device.

Other and more specific objects will be apparent from the features, elements, combinations and operating procedures disclosed in the following detailed description and shown in the drawings.

THE DRAWINGS

FIG. 2A is an enlarged, fragmentary, perspective, exploded view, partially broken away, showing the internal valve assembly incorporated in the device of FIG. 2, taken on the plane 2–2A in FIG. 3;

FIG. 2B is a developed plan view of the external periphery of the shiftable hub valve member 92 shown in FIG. 2A;

FIGS. 2C, 2D and 2E are respective enlarged vertical axial sectional elevation views of the successively telescoped components of the internal valve assembly shown in FIGS. 2 and 2A, shown on the plane 2—2 in FIG. 3;

FIG. 2F is a cross-sectional elevation view of the valve ring member 81 shown in FIGS. 2, 2A and 2D, taken on the plane 2F—2F shown in FIG. 2D;

FIGS. 3, 4 and 5 are successive cross-sectional elevation views of the device of FIG. 3 taken along the planes indicated in FIG. 2 as 3—3, 4—4 and 5—5 respectively;

FIG. 6 is a reduced perspective view of a crankshaft and counterweight assembly employed in the embodiment shown in FIGS. 2–6;

FIG. 7 is a fragmentary cross-sectional elevation view of a portion of the crankshaft and related structures shown in FIGS. 2 and 6 and taken along the plane 7—7 in FIG. 2;

Figure 2:
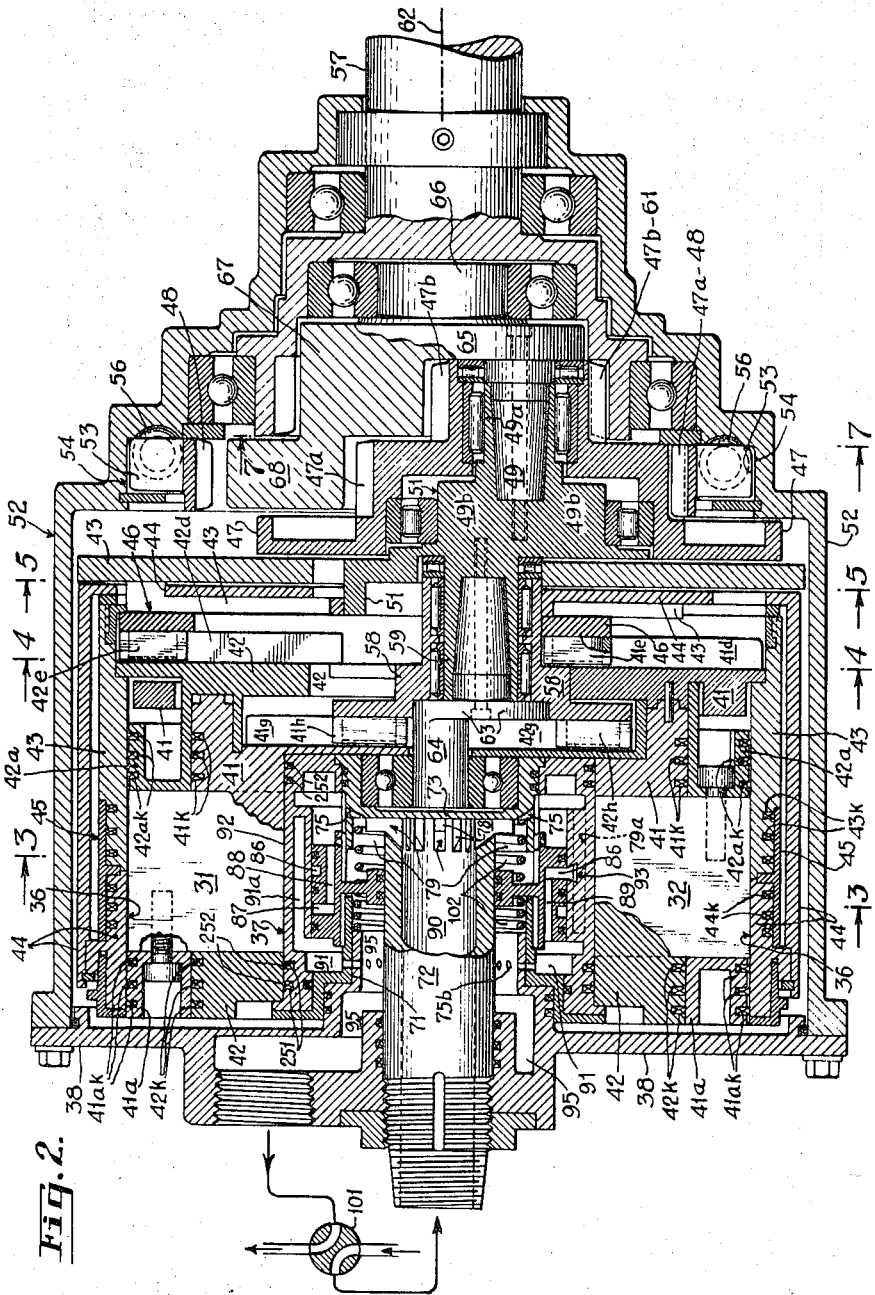
FIG. 2 is a vertical axial sectional elevation view of a compressed gas motor or pump employed in one embodiment of the invention.
Figure 11:
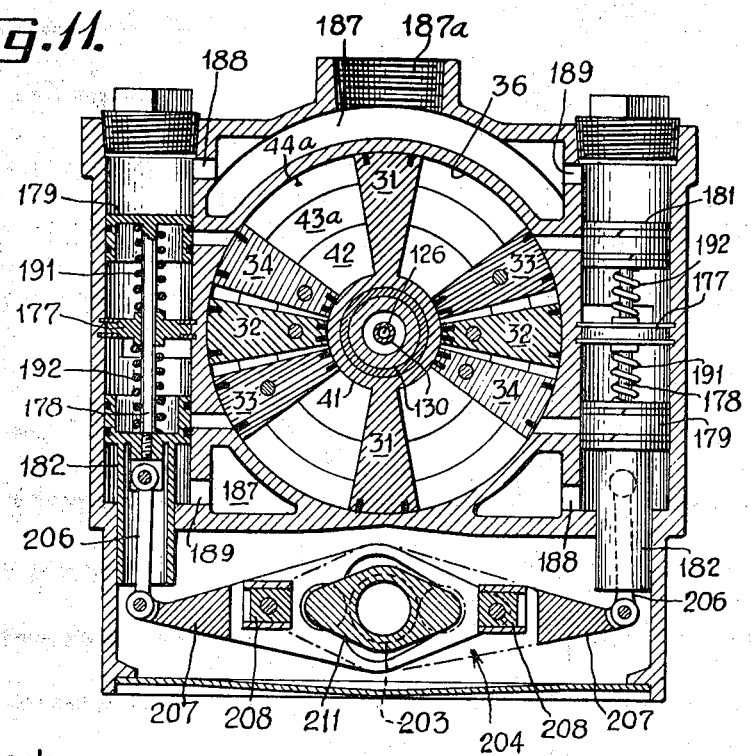
Figure 12:
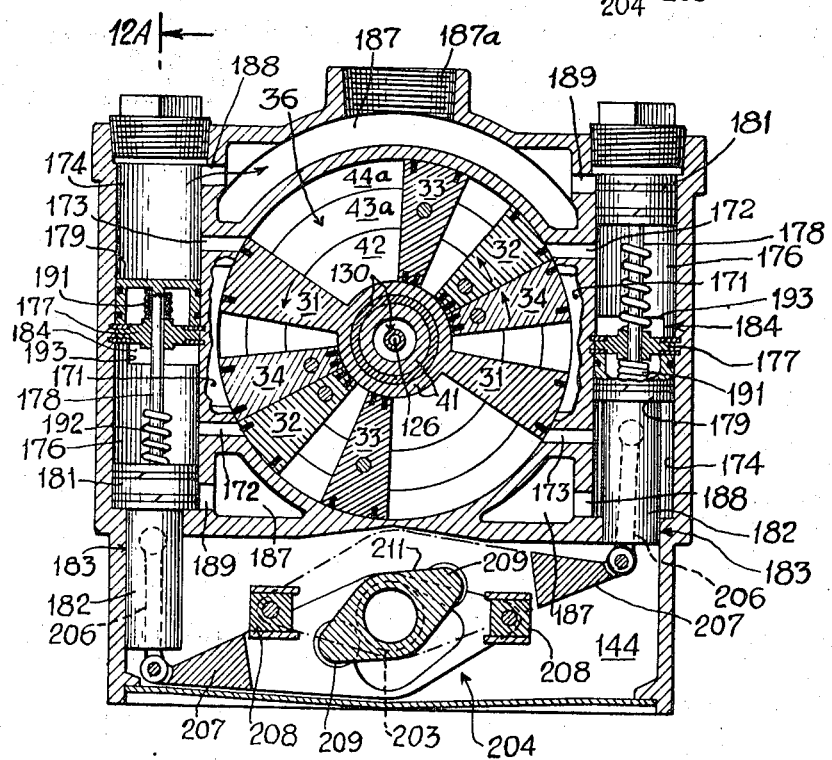
Figure 16:
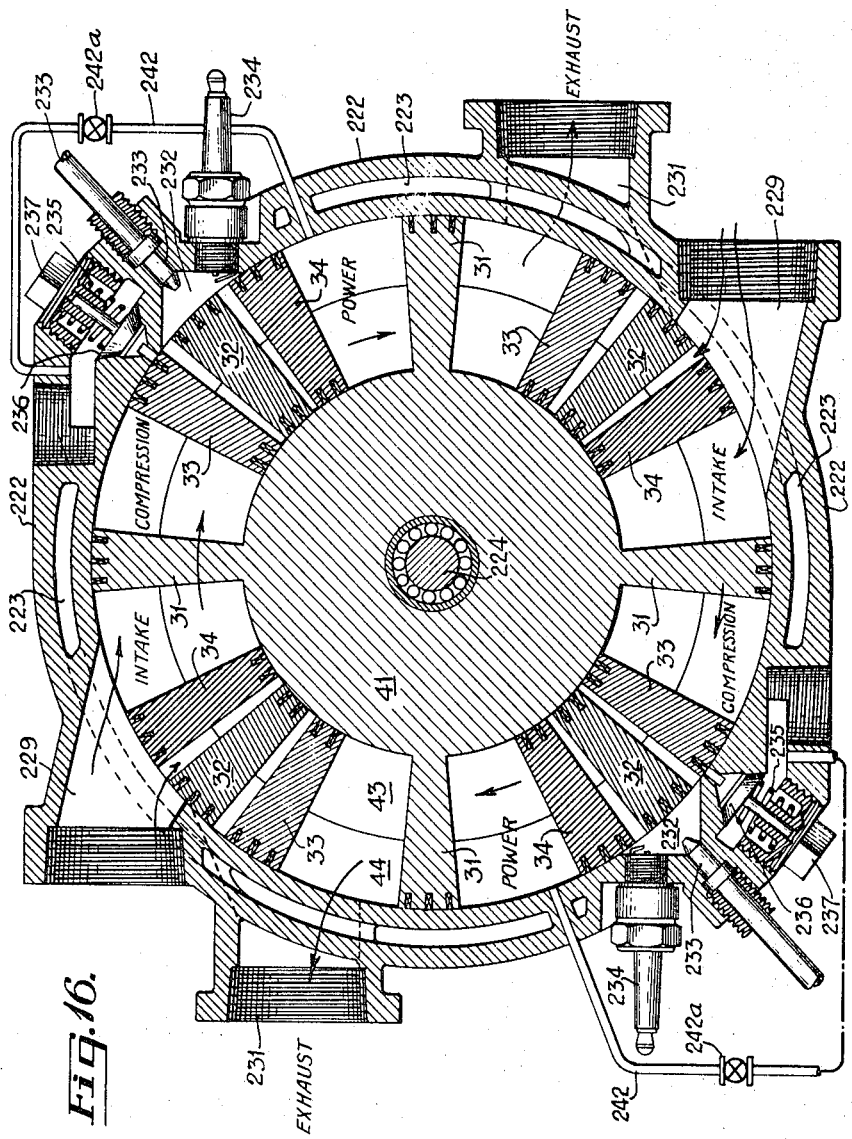

FIG. 8 is a vertical txial sectional elevation view of a different embodiment of the invention, a double shaft motor or pump incorporating sets of rotary pistons and associated mechanism similar to those illustrated in FIG. 2, with separate crankshafts protruding from each end of the device for delivery of input or output torque, and incorporating means for shifting port time in accordance with direction of air feed;

FIGS. 9, 10 and 11 are successive cross-sectional views of the same device taken along the successive planes 9—9, 10—10 and 11—11 in FIG. 8, and FIG. 11 shows the external valve mechanism in a neutral, "stopped" position;

FIG. 12 is a cross-sectional view similar to FIG. 11 showing the external valve mechanism shifted to a running position in which the piston assembly rotates counterclockwise;

FIG. 12A is a fragmentary vertical sectional elevation view of a portion of the external valve assembly shown in FIG. 12, taken along the plane 12A—12A shown in FIG. 12;

FIG. 13 is a vertical axial sectional view of the device incorporating still another embodiment of the invention, illustrated as an engine or gas generator having a single crankshaft extending through the device;

FIGS. 14, 15 and 16 are cross-sectional views of the same device taken along the lines 14—14, 15—15 and 16—16 shown in FIG. 13, with FIG. 15 being enlarged to show the firing chamber and piston set details;

FIG. 17 is a perspective view of the crankshaft incorporated in the device of FIGS. 13 through 16; and FIGS. 18 and 19 are exploded perspective views of the piston drive mechanism installed in the device of FIGS. 13–16, indicating the interfitting engaged relationship of the various support members permitting their interconnection with the connecting members with ample freedom for accelerating and decelerating angular relative movement of the piston sets toward and away from each other as they revolve in the annular chamber.

INTERNALLY VALVED MOTOR OR PUMP

Figure 3:
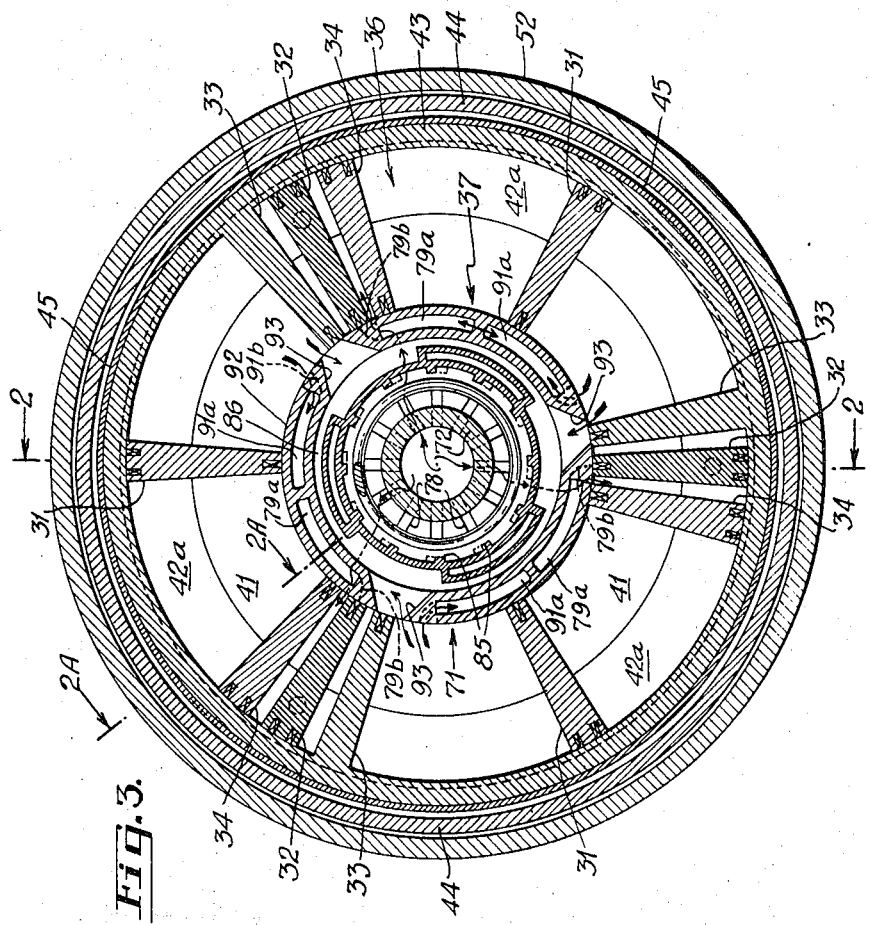

The reversible motor or pump device shown in FIGS. 2–7 incorporates four piston sets 31, 32, 33 and 34, each having three vane pistons angularly spaced from each other by 120°, as shown in FIG. 3, and all successively arrayed in an annular chamber or "ring cylinder" 36 enclosed inside a stator housing formed by a cylindrical housing shell 52 closed by a bolted end wall 38. Annular chamber 36 is bounded around its entire internal periphery by a central, rotatably adjustable hub portion 37 incorporating an angularly shiftable internal valve assembly 71 supported by the end wall 38 of the stator housing. Chamber 36 is bounded on its external periphery and on its sides by the respective support members for the piston sets.

Thus, as shown in FIGS. 2 and 3, the piston set 31 is integrally joined to a ring shaped support member 41, with the junction between the pistons of set 31 and the support member 41 being formed along the radially innermost righthand side portions of the pistons 31, as can be seen in the upper portions of FIG. 2 and the cross-sectional end elevation view of FIG. 3. A corresponding ring shaped support member 42 is integrally joined to the radially innermost lefthand sides of the pistons of set 32, directly across the annular chamber 36 from the support member 41, as shown in the lower portion of FIG. 2.

Auxiliary ring shaped support members for the piston sets 31 and 32 are "diagonally" positioned on the opposite sides of each of these piston sets, radially outward of and in close juxtaposition with the support members 41 and 42. These alternately positioned support members are designated 41a and 42a in FIGS. 2 and 3, showing outer auxiliary ring shaped support member 41a joined to the radially outermost lefthand edges of each of the vane pistons of piston set 31 by sturdy machine screws. Similar machine screws join the outer auxiliary ring shaped support member 42a to the radially outermost righthand edges of each of the vane pistons of piston set 32, as shown in FIG. 2 and FIG. 3, where it will be noted that the tapped bores for these machine screws are formed in the wider outer end of each vane piston of set 32. In this manner the ring shaped support members 41, 41a, 42 and 42a together form complete side walls flanking all of the pistons 31, 32, 33 and 34. The radially juxtaposed ring shaped support members are movably positioned in sliding contact with each other and with the sides of the pistons to which they are not integrally joined.

The outer periphery of the chamber 36 is similarly formed and bounded by two external ring shaped support members 43 and 44, encircled by an aligning guide sleeve 45. The support member 43 extends over the right hand half of the outer peripheral edge of all vane pistons in the four piston sets, and it is integrally joined to the vane pistons of set 33. This support member 43 is formed as a ring shaped shell extending a substantial distance to the right, where it is provided with radial guideways or slides 43d shown at the left hand side of FIG. 4 for sliding engagement with a pivoting pillow block 43e mounted on a "floating" connecting member 46. At a point opposite these "floating" connecting member radial guideways 43d, the support member 43 is provided with another similar radial guideway 43g shown in FIG. 5, cooperating with a pivoting pillow block 43h for sliding engagement with first captive connecting member 47, shown in the lower right hand side of FIG. 2. Captive connecting member 47 has an integral external pinion 47a formed thereon engaged inside a stationary ring gear 48, and this captive connecting member 47 is journalled for rotation on an offset crankpin 49 of the crankshaft 51 (FIGS. 2, 6) with pinion portion 47a revolving inside an overlying counterweight portion 68 of the crankshaft 51. The crankpin portion 49 of the crankshaft 51 is preferably formed as a stepped configuration with a reduced portion 49a, joined to an enlarged portion 49b closer to the annular chamber 36 (FIG. 6). On each of these portions 49a and 49b, roller bearings are interposed between the crankpin 49 and the overlying connecting member 47, securely anchoring the connecting member 47 for rotation upon this crankpin portion 49 of the crankshaft 51 (FIG. 2)

As shown in FIGS. 2 and 5, a ring gear 48 engaging the pinion portion 47a of captive connecting member 47 is preferably journalled in the outer housing shell 52 in a manner permitting slight rotational shifting of ring gear 48 about its own concentric axis 62. Four spring-centering assemblies are mounted in suitable spring cavities 54 formed in housing shell 52 surrounding gear 48, as shown in FIGS. 2 and 5. A protruding vane-type radial flange 53 extends outward from ring gear 48 into each spring cavity 54, and a pair of balanced stiff compressible coil springs 56 are inserted in a slightly compressed condition, between end walls of cavity 54 and the flange 53 when it is positioned centrally in each cavity 54. Spring 56 thus serves to center each flange 53 in its cavity 54 and to provide flexible, resilient bias urging ring gear 48 toward this centered position for valving purposes, while serving to cushion the gearing against shock loading, and also serving to absorb high torque stresses imposed by the normal operation of the device or by sudden loads applied to the output shaft 57, shown in FIG. 2. As indicated in FIG. 5, the same assembly of flange 53 and two flanking springs 56 in cavity 54 is preferably incorporated at four points equally spaced about the periphery of the ring gear 48 to provide balanced cushioning action for the ring gear.

At a point on crankshaft 51 between the plane of the floating connecting member 46 and the annular chamber 36, a second captive connecting member 58 is journalled on roller bearings mounted on a second crankpin 59 (FIGS. 2, 6), having a crankthrow radius less than that of the crankpin 49 in the preferred embodiment illustrated in FIG. 2. The crankthrow radius of this second crankpin 59 is selected so that the ratio of this radius to the crankthrow radius of the driving pins on the second captive connecting member 58 equals the corresponding ratio of the crankthrow radius of the crankpin 49 to the crankthrow radius of the driving pins on the first captive connecting member 47, while also providing overall dimensions commensurate with practical assembly requirements.

It will be noted in comparing FIG. 5 with FIG. 7 that the central axis of first crankpin 49 journalling first captive connecting member 47 in this preferred embodiment of the device is twice as far from the common central axis 62 of gear 48, output shaft 57 and housing shell 52, as compared with the offset crankthrow radius of second crankpin 59 on which second captive connecting member 58 rotates. The radial crankthrow offset distances of the two crankpins 49 and 59 may be compared directly in FIG. 2, and also in the cross sectional elevation views of FIGS. 7 and 5, which are drawn to the same scale.

As indicated in the middle of FIG. 2, the support members 41, 42, 43 and 44 all extend into the central portion of the shell 52 of housing 38 to provide connections by sliding pivoting bearing blocks with the captive connecting members 47 and 58, and also with the floating connecting member 46. This portion of the device may be compared to the crankcase of a conventional internal combustion engine, and splash or pressure lubrication is preferably employed in this region.

The sectional views of FIGS. 4 and 5 respectively illustrate the positions of the floating connecting member 46 and the first captive connecting member 47 when the parts of the device are in the positions shown in FIG. 2. Thus by comparing the views of FIGS. 2, 4 and 5, it will be noted that the geared first captive connecting member 47 is connected by the pivoting sliding block 43h to the radial guideway 43g on the support member 43 which is secured to piston set 33, as indicated at the right hand side of FIG. 5. The geared first captive connecting member 47 is also connected by pivoting sliding block 44h to the radial guideway 44g on the support member 44 which is secured to piston set 34. Since FIG. 5 is a sectional view, taken along a plane 5—5 passing between flanged section of the support members 43 and 44, as shown in FIG. 2, support member 43 is shown in full lines in the view of FIG. 5 while the support member 44 is shown only by its radial guideway 44g.

It should be noted that the shaft and bearing appearing in the central portions of FIG. 4 and FIG. 5 are the central hub sleeve portion of the second captive connecting member 58 mounted in roller bearings on the lesser radius crankpin 59 of crankshaft 51.

As shown in FIGS. 2, 5 and 7, the large diameter pinion portion 47a of member 47 encircling the enlarged hub portion 49b of the larger crankthrow radius first crankpin 49 has a pitch diameter of 4" in the preferred embodiment illustrated. Ring gear 48 engaged therewith has a 6" pitch diameter in this embodiment. The first captive connecting member 47 is also provided with a smaller pinion portion 47b having a 2" pitch diameter, for example, in the preferred embodiment illustrated, which is engaged with the teeth of a movable internal ring gear 61 formed within the concave open end of the output shaft 57 journalled in heavy roller bearings in the right end of the housing shell 52 for rotation about the central axis 62 of the device, and thus forming an output speed reducer assembly.

The offset crankpin portions 49 and 59 of the crankshaft 51 are integrally joined together by the enlarged portion 49b, and they are joined by sturdy crankarms 63 and 65 to terminal trunnions 64 and 66 journalled for rotation about the central axis 62, as shown in FIGS. 2 and 6. Thus, the lefthand end of the lesser crankthrow radius second crankpin 59 is secured by crankarm 63 to the projecting trunnion shaft portion 64 rotatably mounted in heavy ball bearings secured in a bearing flange 74 (FIG. 2E) formed in an assembled sleeve portion 72 of the housing end wall 38 which forms a part of the internal valve assembly 71 described in detail below and shown in FIGS. 2A through 2F. The righthand end of the larger crankthrow crankpin 49 is likewise anchored by a substantial crankarm 65 to a trunnion shaft portion 66 journalled in heavy roller bearings mounted within the concave open end of output shaft 57, recessed within its internal ring gear teeth 61.

The crankarm 65 joining crankpin 49 to trunnion portion 66 extends radially beyond trunnion portion 66 in a direction opposite to the crankpin 49 to form a heavy "double" counterweight 67–68, having a first counterweight portion 67 dimensioned to fit between the pinion 47b and its mating internal ring gear 61 and having its outer periphery bounded by clearance circles respectively concentric with these mating gears and forming the crescent shape 67 indicated in FIGS. 6 and 7. An axial extension from the outermost central region of this counterweight portion 67 is further extended radially outward and offset toward chamber 36 to form a second counterweight portion 68 which is similarly bounded by circles concentric with the mating pinion 47a and housing-mounted large ring gear 48 engaged therewith, thus forming the further counterweight portion 68 illustrated in FIG. 7 and also in the perspective view of FIG. 6.

While the pivoting pillow blocks of the second, ungeared captive connecting member 58 are not illustrated in cross-sectional views in the figures, they are shown in the axial sectional elevation view of FIG. 2. These pivoted bearing blocks 41h and 42h are slidably mounted in the two radial guideways 41g and 42g on the support members 41 and 42.

As indicated in FIG. 4, the floating connecting member 46 is connected by pivoted bearing blocks to the support members for each of the piston sets. In this FIG. 4 the pivoted bearing blocks are identified as 41e, 42e, 43e and 44e, respectively engaged for radial sliding movement in the radial guideways 41d, 42d, 43d and 44d on the respective vane piston set support members 41, 42, 43 and 44.

As indicated in FIG. 4, the sliding blocks are secured to the floating connecting member 46 only by studs or "pins" protruding from the connecting member 46 and journalled in each of the sliding pillow blocks. As shown in FIGS. 2 and 4, the pins joining floating connecting member 46 to the piston sets 31 and 32 protrude in an axial direction toward the piston chamber 36, while the pins joining the floating connecting member 46 to the piston sets 33 and 34 protrude from connecting member 46 in an axial direction away from the chamber 36. In each case, the face of the ring shaped floating connecting member 46 is cut away to accommodate the radial guideways of the support members which are slidingly engaged with the pivoted sliding blocks, and the shape of these cut-away portions is configured to permit relative rocking movement of the support members and the floating connecting member 46, as indicated in FIG. 4. A comparable configuration of a modified floating connecting member 225 is shown in perspective in FIG. 18.

It will be noted that only the first captive connecting member 47 is drivingly engaged with the ring gear 48 by means of its pinion portion 47a. The second captive connecting member 58 is not drivingly engaged with a ring gear, and the interconnection of the piston sets by way of their support members and the floating connecting member 46 cooperates with the two captive connecting members 47 and 58 to maintain the piston sets in their desired relatively accelerating and decelerating relationship during rotation of the piston sets, whether produced by motor operation controlled by valve assembly 71, or by driving rotation of output shaft 57 when torque is being applied thereto in order to drive the device as a pump. As shown in the figures, all three connecting members 46, 47 and 58 are positioned on the same side of chamber 36, the righthand side as viewed in FIG. 2.

When the device of FIGS. 2–7 is being employed as a motor, pressure and exhaust are respectively connected to differential portions of the piston chamber 36 by the internal valve assembly 71 illustrated at the lefthand side of FIG. 2, and described in detail below.

In the illustrated embodiment, with a stationary 6″ pitch diameter ring gear 48 meshing with 4″ pitch diameter pinion 47a to drive the crankshaft 51 two revolutions in one direction for each revolution of the piston sets in the other direction, the 4″ pitch diameter internal ring gear 61 on the output shaft 57 is driven by the 2″ pitch diameter spur gear teeth 47b at one half the speed of the piston sets and in the opposite direction. In this illustrated embodiment the annular chamber 36 swept by the vane pistons has an outside diameter of 8″ and an inside diameter of 4″. The outside diameter of the inner side wall support members 41 and 42 is 6.328″, which is so chosen so that the wall areas of piston support members 41 or 42 exactly equals the comparable wall areas of their respective cooperating auxiliary support members 41a or 42a, to completely balance out any lateral, axial forces imposed on these support members resulting from operating pressures within chamber 36.

INTERNAL SHIFTING VALVE ASSEMBLY

A shiftable valve assembly 71 is incorporated inside the rotatable adjustable hub portion 37 of housing end wall 38, and forms the internal cylindrical wall of annular piston chamber 36, with the radially innermost edge of each vane piston being in sliding engagement with this hub portion 37, as shown in FIGS. 2 and 3. As shown in the exploded view of FIG. 2A, valve assembly 71 incorporates three separate portions telescopically fitted together for sliding inter-engagement, a central sleeve 72, a valve ring member 81 and a hub valve member 92.

The innermost of these portions is the stationary central sleeve 72 (FIGS. 2, 2A, 2E) anchored by external threads and splines within a central threaded opening in the housing end wall 38, in the predetermined angular position shown in FIGS. 2 and 3. Sleeve 72 extends axially inside the housing 52, directly within and concentric with the annular piston chamber 36. The inner end of sleeve 72 is provided with a radial flange 73 extending radially outward a short distance and terminating in two axial flanges.

The first of these anges is a bearing flange 74 extending further in an axial direction toward the opposite end of the device, within which a heavy ball bearing assembly is seated to accommodate trunnion portion 64 of the crankshaft 51 (FIG. 2).

Extending reversely in the return direction toward the anchoring threads of sleeve 72 is a reverse flange 76 incorporating on its outer periphery gently pitched helical spline grooves 77 characterized by a "'righthand thread" helix as shown in FIG. 2A. In addition, a series of radially extending slots 78 connect the interior 90 of the sleeve 72 with the space which is enclosed immediately within the spline flange 76 and which forms a portion of an inner righthand chamber 79 surrounding the inner end of the sleeve 72, as shown in FIG. 2.

Slidingly engaged for both axial and rotary movement on sleeve member 72 is a second portion of the valve assembly 71. This is a valve ring member 81 incorporating a radial wall portion 82 terminating inwardly in an axially elongated ring flange 83, dimensioned for axial and rotary sliding engagement on the external surface of sleeve 72 and provided with suitable sealing rings riding on this external surface. Outwardly, radial wall portion 82 terminates in a diverter ring portion 84 designed to connect the chambers formed on opposite sides of the radial wall portion 82 with selected valve ports communicating directly with piston chamber 36 (FIG. 2). Gently pitched helical splines 85 are formed on the internal cylindrical surface of diverter ring portion 84 at its right end, engaging splines 77 on flange 76 of sleeve 72. Diverter ring portion 84 is also provided with two annular grooves encircling its external periphery, a righthand groove 86 closer to the inside of housing shell 52, and a lefthand groove 87 closer to the housing end wall 38 in which sleeve 72 is anchored. A first conduit 88 formed in diverter ring portion 84 joins lefthand groove 87 with the righthand chamber 79 enclosed between radial wall portion 82, diverter ring portion 84, reverse spline flange 76 and radial flange 73, via the spaces between the mating splines of flanges 76 and 84 or by way of apertures formed in these flanges, such as apertures 75 in flange 76, or apertures 75a in flange 84, or both, as shown in FIGS. 2A and 2E. The lefthand groove 87 thus communicates directly with a "central portal" cavity 90 inside stationary sleeve 72.

A second conduit 89 also formed in diverter ring portion 84 (FIG. 2) joins the righthand groove 86 to a chamber 91 at the left end of diverter ring portion 84, communicating via apertures 75b in hub valve member 92 with an "outer portal" cavity 95 on the left or "outer" side of radial wall portion 82, bounded by valve ring member 81, stationary sleeve 72, and housing end wall 38.

The righthand groove 86 or the lefthand groove 87 are alternatively connected to the interior of piston chamber 36 by a series of chambers and valve ports formed in shiftable hub valve member 92 shown at the lefthand side of FIG. 2A.

The periphery of hub valve member 92 forms a partially rotatable central hub 37 directly inside annular piston chamber 36. and three radial exhaust ports 93 pass through this cylindrical peripheral wall 37 of member 92, connecting piston chamber 36 to "exhaust" via either groove 86 or groove 87 of member 81, depending upon the mode of operation of the device.

A flange 96 of hub valve member 92 is provided with gently pitched lefthand helical splines 97 slidably engaged with corresponding lefthand helical splines 98 formed on the inside of diverter ring portion 84 of the valve ring member 81 at the lefthand end thereof. Hub valve member 92 is also provided with a central cylindrical chamber 99 in which the valve ring member 81 is slidably fitted with its splines 98 engaging the splines 97 of hub valve member 92, and with its outer periphery sliding in sealing ring engagement with the internal periphery of this chamber 99 of hub valve member 92.

Three exhaust ports 93 passing radially through the peripheral wall 37 of hub valve member 92 are formed with a narrow internal axial width, enlarging to a wider external axial width exposed to piston chamber 36. The narrow internal width of exhaust ports 93 is designed for alternative juxtaposition with one of the peripheral grooves 86 or 87 formed in the valve ring member 81, in order to insure that these ports 93 are always connected to the low pressure "exhaust" side of valve ring member 81. This ring member 81 shifts axially away from pressure in response to the pressure differential applied to the opposite sides of its radial wall portion 82 via control valve 101 by way of chambers 90 and 79 and by way of portal cavity 95. Thus the exhaust ports 93 are always connected to the peripheral groove 86 or 87 nearest the low pressure side and thus to the low pressure side by the axial conduits 88 or 89 formed in diverter ring flange 84. Selection of these axial conduits 88 or 89 is achieved by supplying compressed gas and negative pressure or atmospheric pressure respectively to central portal 90 and outer portal cavity 95, to place the device in its "forward" mode, or reversely respectively to portal 95 and to portal 90, to place the device in its "reverse" mode of operation, by such means as the operation of an external fourway control valve 101 making these connections through suitable conduits associated with end wall 38 of the stator housing adjacent to valve assembly 71. In FIG. 2, for example, the lefthand groove 87 is inactive and the righthand groove 86 is shown aligned with exhaust ports 93 just below the center of FIG. 2.

As shown in FIGS. 2, 2B and 3, the outer wall 37 of the hub valve member 92 is provided with six internal hollow chambers alternately "interleaved" in two sets of three, with one set 79a connected to the righthand inside end 79 of the central chamber 99 of member 92 and thus to portal 90, and the other set 91a connected to the lefthand end 91 of this chamber and thus to portal 95. As shown in the developed view of FIG. 2B, the chambers of each set are positioned around the periphery of hub valve member 92, between the exhaust ports 93, with the sector between each adjacent pair of exhaust ports 93 including one chamber from each set. From each of these chambers 79a and 91a, respective radial ports 79b or 91b open outwardly into the piston chamber 36, and are formed closely adjacent to the exhaust ports 93. These auxiliary ports serve to supply pressure or auxiliary exhaust connections at the preselected peripheral points in annular chamber 36, in accordance with the position of control valve 101.

In the "forward" mode shown in FIG. 2, the exhaust ports 93 are all connected via peripheral groove 86 in valve ring member 81 to the exhaust by way of outer portal cavity 95. Thus, pressure applied via central portal 90 to the righthand side of the movable valve ring member 81 has had the effect of moving this member 81 to the left in FIG. 2, connecting the exhaust ports 93 to the non-pressurized side of member 81 via groove 86. This axial movement of valve ring member 81 has also caused rotation of both valve ring member 81 and the hub valve member 92 by virtue of the "dual splined" engagement of these members with the stationary sleeve member 72, thus effecting rotation of hub surface 37 (FIG. 2B) for proper positioning of all ports 93, 79b and 91b. This motion is further controlled by the springs 102 flanking radial wall 82 of the valve ring member 81.

With greater pressure supplied to central portal 90 of the valve assembly 71, valve ring member 81 moves further to the left and compresses the lefthand spring 102 to a greater extent, producing correspondingly greater rotational movement of the ports of hub surface 37 shown in FIG. 2B, and a resulting quicker cutoff of intake ports, as illustrated in the cross-sectional view of FIG. 3. In this FIG. 3, the central valve ring member 81 has moved through a counterclockwise angle and the hub valve member 92 has moved twice as far, through a double counterclockwise angle, because of the cumulative effect of the dual-spline assembly. Because all piston sets are rotating in a clockwise direction in the chamber 36, this counterclockwise movement of the hub valve member 92 produces a quick cutoff in the intake portion of the cycle when the pistons are separating and drawing in or receiving the pressure fluid through ports 79b.

When control valve 101 is shifted to place the device in the reverse mode, ring member 81 shifts through a clockwise angle and moves to the right, hub valve member 92 shifts twice as far through a double clockwise angle (as viewed in FIG. 3), and groove 87 connects exhaust ports 93 to central portal cavity 90, completing all port connections for reverse operation of the device.

With higher pressures, the reaction to the torque impressed on the output shaft 57, which rotates in the direction opposite to the piston sets' direction of rotation, produces a slight angular shifting of ring gear 48 relative to housing 52 since ring gear 48, positioned by the resilient springs 54, provides the only "fulcrum" for the output torque. This reaction displacement of ring gear 48 supplements the angular motion of hub valve member 92 just described, and further controls the timing of the intake ports for quicker cutoff and higher pressures. In this manner, the intake cutoff point can be controlled so that exhaust pressures are stabilized and maintained at the most efficient point, and unwanted variations in supply pressure are counteracted by additional shifting of the hub valve member 92, which is supplemented by the corresponding shifting of ring gear 48 to produce the same effect, thus producing highly efficient operation of the motor devices of this invention.

EXTERNALLY VALVED MOTOR OR PUMP

A second motor or pump embodying the novel features of the invention is illustrated in FIGS. 8, 9, 10, 11 and 12. In the large axial sectional elevation view of FIG. 8, the details of the vane piston sets, their supporting crankshaft segments and bearings, their central seal, and their central "floating" connecting members are shown generally, and these features are substantially similar to the corresponding features shown in the previous FIGS. 2–7 illustrating the internally valved motor or pump device.

In this second embodiment of the invention, as shown in FIGS. 11 and 12, in annular chamber 36 there are four piston sets 31, 32, 33 and 34, each having two vane pistons. Piston sets 31 and 33 are respectively supported on adjacent central "hub-ring" type support members 41 and 43 having a guide sleeve 130, incorporating a common central bore 126, concentrically mounted inside their axial center apertures, aligning these support members and equalizing pressures in the two drive mechanisms on opposite sides of the vane piston sets in chamber 36.

It is to be noted that lateral, axial thrust loads generated by gas pressures against sidewalls 41a and 43a are transferred to thrust bearing pads such as roller thrust bearings 125 located outside of chamber 36 and between "hubtype" support members 41 and 43 of these piston sets and a sealing sleeve 130. In a similar manner, all lateral thrust for all piston sets can be taken by thrust bearings located outside of the working chamber 36 where this is considered preferable.

As shown in FIGS. 11 and 12, in addition to the "hubtype" support members 41 and 43, there are three concentric annular support members successively radially juxtaposed flanking each side of the piston sets and forming the side walls of the piston chamber 36 in this embodiment of the invention, as compared with the two concentric and successively radially juxtaposed ring-shaped piston support members 41–42a and 42–41a positioned on each side of the piston chamber of the previously described embodiment, which are best shown in FIGS. 2 and 3. In the present case, these support members 41, 42, 43a and 44a are shown successively arrayed in radial juxtaposition in FIG. 11 and FIG. 12, and at the center of FIG. 8.

As was the case with the pair of support members 41 and 41a and also with the pair of support members 42 and 42a in the first embodiment shown in FIG. 2, the support members of the second embodiment shown in FIG. 8 are formed as separate rings of different radius securely anchored to or integrally formed with each vane piston of their respective piston sets. Thus, referring to the left center section of FIG. 8, the multi-part side wall of piston chamber 36 which has been removed to create the sectional view of FIG. 11 includes a central "hub-type" support member 43 similar to the "hub-type" support member 41; a support member 44 which is a mirror image of the support member 42; a support member 41a which is a mirror image of the support member 43a; and a support member 42a which is a mirror image of the support member 44a.

Substantially similar crankshafts 128 are shown at opposite ends of FIG. 8 for delivering torque to the device when it is used as a pump, and for delivering torque from the device when it is used as a motor. As shown at the righthand end of FIG. 8, the crankshaft 128 is mounted for rotation in a ball bearing 129 seated in an end wall 131, which is bolted to end flanges formed on a generally cylindrical stator housing shell 132 enclosing the device. An enlarged counterweight portion 133 of the crankshaft 128 is rotatably mounted in similar heavy-duty ball bearings 134 anchored inside the housing shell 132. An intermediate portion 136 of the crankshaft 128 is dimensioned to rotate just inside the teeth of an angularly adjustable ring gear 137, and this intermediate crankshaft portion 136 is formed with a pinion recess accommodating a pinion portion 138 of a first captive connecting member 139 journalled for rotation about an offset crankpin axis 141 of a crankpin 142, which forms an assembled but integral part of the crankshaft 128.

On each side of the vane pistons of sets 31, 32, 33 and 34 will be seen a floating connecting member 140 pivotally connected by its pivot pins 41f and 42f with pillow blocks 41e and 42e slidably mounted in radial guideways on the piston set support members 41 and 42. Similar pivot pins 43f and 44f connect each of these floating connecting members to the support members 43 and 44 of the other two piston sets 33 and 34. Floating connecting members 140 are not connected in any way to either crankshaft 128, and each floating connecting member 140 is unpositioned except by the sum of its pivotable slidable bearing connections to all of the piston sets.

The positions of the moving parts of the device shown in FIG. 8 correspond to the positions shown in FIG. 11, where the pistons of set 31 are moving at maximum velocity and those of set 32 are moving at minimum velocity.

As shown in FIG. 8, the first captive connecting member 139 is rotatably mounted in heavy roller bearings 143 seated on the enlarged counterweight portion 133 of the crankshaft 128. As shown at the righthand side of FIG. 8, a number of connecting oil passages 159 are formed in captive connecting member 139 just inside the teeth of its pinion portion 138, communicating with a passage 162 in crankpin 142.

POSITIVE LUBRICATION SYSTEM

A positive lubrication system is provided in the devices of this invention by employing the engaging teeth of pinion 138 and its ring gear 137 to form a reversible gear pump serving to draw lubricant from a sump 144 formed in the base of the housing shell 132 through a delivery conduit 146 and a fitting 147 into a sector-shaped intake chamber 148 formed beside the roller bearing 129 supporting the end of crankshaft 128.

The sump 144 positioned below annular chamber 136 is necessary so that oil may be stored in a relatively cool region below the working chambers enclosed between the vane pistons when the device is not in operation, so that oil cannot slip into and collect in these chambers to the detriment of operation, yet will always be immediately drawn up and delivered to the moving parts when operation commences.

Passing diametrically through the crankshaft 128 is a fluid passageway shown in FIGS. 8 and 9, including an enlarged central valve chamber 149 with a central peripheral port groove 151 flanked by two parallel peripheral terminal port grooves 152 beyond which reduced end portals 153 open outward into the intake chamber 148. Positioned in the valve chamber 149 is a transverse central piston disc 154 capable of sliding axial movement to allow center port groove 151 to communicate with one or the other of the terminal port grooves 152 through the valve chamber 149. Piston disc 154 is mounted for this sliding axial movement on an elongated valve rod 156 axially positioned for lengthwise reciprocation in valve chamber 149 and provided at its opposite terminal ends with valve "plugs" 157 slidably movable into blocking engagement in one or the other of the portals 153 upon axial movement of rod 156. As shown in FIG. 9, when the device is stationary, and not running, the valve rod 156 is centered with its end plugs 157 just blocking both end portals 153 by centering springs 155 secured in the portals 153.

Rotation of the first captive connecting member 139 permits the intermeshing teeth of its pinion portion 138 and a ring gear 137 to serve as an oil pump, since they revolve in the recessed cavity formed in portion 136 of crankshaft 128. The teeth of pinion 138 are engaged with those of ring gear 137 only at one point on the periphery, forcing oil out from between the teeth at this point ahead of themselves and drawing oil back in behind them, and thus pumping lubricant. Accordingly, the central port groove 151 in chamber 149 is connected by a generally longitudinal delivery conduit 158 to longitudinal passages 159 formed in captive connecting member 139 communicating with a recessed cavity 161 formed between this member and its crankpin 142 opening into a longitudnial passage 182 formed in the crankpin.

Two passages 163 (FIG. 10) connect the respective terminal port grooves 152 in chamber 149 with opposite sides of the cavity in crankshaft 128 within which pinion portion 138 rotates. Through this series of passages lubricant under pressure expelled by the engaging gear teeth travels through chamber 149 and passes along the crankpin 142 and into the central portion of the device for lubrication of the moving drive mechanism parts therein. Accordingly, rotation of the crankshafts 128 in either direction creates a pressure differential between these two intake passages 163, and thus between the opposite ends of chamber 149 with which they are connected; for example, increased oil pressure will thus be supplied to the right end of chamber 149, as shown in FIG. 9. This increased fluid pressure forces the central piston disc 154 to the left, exposing central port groove 151 to this higher pressure, while simultaneously urging the righthand valve plug 157 to the right, counteracting the centering force supplied by the centering springs 155 and moving valve rod 156 to the right, and thus maintaining the righthand end portal 153 closed while opening the lefthand portal 153 to expose the lefthand terminal port groove 152 (which now communicates with the low pressure side of the pinion 138) to sector intake chamber 148, which is connected by delivery conduit 146 to oil sump 144.

By this means, a positive pressure oil delivery system is provided, drawing lubricant from the sump 144 through chamber 148 into the pinion recess in the center of crankshaft 128, forcing it through one of the passages 163 to grooves 152 in the valve chamber 149, and thence through the delivery passages 159, 161, and 162 to lubricate the working drive mechanism parts of the device adjacent to the piston chamber 36.

Since in operation the valve rod 156 moves in one direction, while the central piston disc 154 moves in the other, this action avoids any overall unbalance of the rotating parts, while allowing centrifugal force to take over from oil pressure at higher speeds to hold the central piston discs 154 and 156–157 in the desired positions against the force of the centering springs 155 and thus avoiding any unnecessary power loss in operation of these discs.

When the device stops, the centering springs 155 restore piston discs 154 and 156–157 to the centered position shown in FIG. 9, and starting rotation of crankshaft 128 in either direction automatically shifts these piston discs to deliver oil under positive pressure to the drive mechanism parts automatically. When the device is shifted between its "forward" and "reverse" operating modes, the resulting reversed direction of rotation of pinion 138 in ring gear 137 merely reverses the selection of the delivery passage 163 (FIG. 10) receiving lubricant under pressure, shifting valve rod 156 and central piston disc 154 to their opposite terminal positions, and thus delivering lubricant from central port groove 151 through the same central delivery passage 158 to lubricate the moving drive mechanism parts as before.

As shown in FIG. 8, similar positive lubricant delivery systems are provided in both crankshafts 128 at both ends of the device, providing a parallel lubricant delivery system. Thus lubricant passes through the moving parts of the device adjacent to the piston chamber 36 and eventually descends by gravity to the bottom of housing shell 132, where return ports 164 drain the lubricant directly into the cool sump 144 for recirculation. The return ports 164 avoid accumulation of fluid lubricant near the bottom of the piston chamber 36, assuring that deposits of fluid lubricant will not accumulate in any part of the piston chamber 36 between operational periods of the device.

While external lubricant pumps may be used in some cases, the self-actuating positive lubrication systems of this embodiment of the invention assure automatic lubrication and cooling of all moving parts of the drive mechanism; sump 144 is cooled by movement of heat to the surrounding stator housing, and by cooling water jacket passages if desired.

These continuously-acting and automatically-reversible lubricant delivery systems thus comprise highly effective means for drawing oil from a cooled sump, delivering it through both ends of the motor or pump device, splashing or spraying it upon the moving parts of the drive mechanism and support members forming the chamber walls, which throw the lubricant radially outward by centrifugal action for lubricating all principal sliding surfaces of the device, after which the lubricant drains back into sump 144 for cooling and recirculation.

EXTERNAL SHIFTING VALVE ASSEMBLY

As shown in the transverse central cross-sectional views of FIGS. 11 and 12, both taken along the plane 11—11 shown in FIG. 8, external valve port means are positioned about the periphery of piston chamber 36 along this midsection, forming a port arrangement comparable to the arrayed ports formed in the central hub valve member 92 in the valve assembly 71 of the device shown in FIGS. 2–7. The external valve ports of the second embodiment shown in FIGS. 8–12 include a central exhaust port 171 formed on each side of the piston chamber 36, flanked by upper and lower auxiliary ports closely adjacent to each central exhaust port 171. As shown in FIG. 12, the lower left and upper right auxiliary ports 172 may be called "forward" ports, and the upper left and lower right auxiliary ports 173 may be called "reverse" ports, since the forward ports 172 serve as intake ports in the "forward" mode for counterclockwise rotation of the vane piston sets (FIG. 12), while reverse ports 173 serve as intake ports in the "reverse" mode.

On each side of the device, as shown in FIGS. 11 and 12, the auxiliary ports 172 and 173 communicate with opposite end chambers 176 and 174 of a generally vertical cylindrical valve chamber, which is divided into these two end chambers, "reverse" chamber 174 and "forward" chamber 176, by a transverse wall 177 having a central axial bore slidably supporting a reciprocable valve rod 178 integrally connecting a reverse valve piston 179 and a forward valve piston 181 respectively slidable in chambers 174 and 176, forming on each side of chamber 36 a single reciprocating piston and rod unit whose lower end is provided with an extended co-axial sleeve 182 fitted for longitudinal sliding movement in a reduced bore 183 co-axial with the chamber 174–176 and extending downward into the sump 144, to provide closure for oil sump 144 regardless of movement of the piston and rod units. Connecting rods 206 inside sleeves 182 provide articulated connections with a pivoted rocker arm linkage and shift lever assembly 204 connected with a variable ring gear angular shifting mechanism illustrated in FIG. 10, as described in more detail below.

As shown in FIG. 12, in the "forward" mode the left reverse valve piston 179 has moved down in the upper chamber 174 to connect the left (upper) reverse port 173 with that portion of chamber 174 above piston 179, vented to exhaust, while piston 181 has moved down in chamber 176 to connect forward port 172 with that portion of chamber 176 between piston 181 and wall 177. On the right, these upper and lower valve assemblies are reversed to place them in corresponding angularly displaced relationship with exhaust ports 171.

As shown in FIG. 12A, which is a fragmentary longitudinal vertical sectional elevation view taken along the lines 12A—12A in FIG. 12, a pair of connecting passages, a righthand "forward" connecting passage 184 and a lefthand "reverse" connecting passage 186, flank the two ended valve chamber 174–176 and extend upwardly to open through ports 184a and 186a atop housing shell 132 (FIG. 8). Centrally positioned between the ports 184a and 186a is an exhaust port 187a connected with an exhaust chamber 187 generally surrounding the central portion of the piston chamber 36 and connected thereto by the central exhaust ports 171 on each side of chamber 36, as shown in FIGS. 8 and 12. In FIG. 12 it will be noted that the exhaust chamber 187 is connected to the extreme upper end of the upper left "reverse" valve chamber 174, and also to the extreme lower end of lower right reverse valve chamber 174 via reverse exhaust vents 188. The extreme ends of the forward chambers 176 are similarly connected to exhaust chamber 187 via forward exhaust vents 189, blocked by pistons 181 in the "forward" mode positions shown in FIG. 12.

In the neutral, "stopped" condition of the device shown in FIG. 11, valve rods 178 are shown substantially centered in their walls 177, extending approximately equal distances into the reverse valve chambers 174 and the forward valve chambers 176. Compressed between each wall 177 and the facing sides of the two pistons 179 and 181 integrally anchored to each valve rod 178 are a pair of compressible coil springs, a forward coil spring 191 compressed between reverse piston 179 and wall 177 in the "forward" mode shown in FIG. 12, and a reverse coil spring 192, which is compressed between each forward piston and wall 177 in the "reverse" mode.

Referring to FIGS. 12 and 12A, it will be seen that the righthand forward connecting passage 184 is connected to the forward valve chambers 176 by a "counterclockwise" or "forward" pressure port 193 in the "forward" operating mode there illustrated. A reverse pressure port 194 (FIG. 12A) connects reverse connecting passage 186 to reverse valve chamber 174 in the reverse mode wherein the pistons 179 and 181 are shifted to their opposite terminal positions.

Thus, in the "forward" mode, compressed gas delivered via port 184a to counterclockwise forward connecting passage 184 is admitted through forward pressure port 193 to forward valve chamber 176 at the lower lefthand side of the device, driving the lower left valve piston 181 downward; at the same time compressed gas is admitted via counterclockwise forward pressure port 193 into the upper right "forward" valve chamber 176 on the right-hand side of the device, driving the upper right valve piston 181 upward on that side. Pistons 181 thus close and block both exhaust vents 189. Accordingly, upper left and lower right "reverse" auxiliary ports 173 are vented via reverse valve chambers 174 and exhaust vents 188 directly to the exhaust chamber 187.

The vane piston set 31 is shown just completing the power stroke, and the expanded working chambers between vane piston sets 31 and 33 are shown about to vent via the reverse auxiliary ports 173 at the upper left and lower right to begin the exhaust stroke of the device. Piston set 31 is decelerating while piston set 33 is entering the high velocity portion of its cycle, pushing the spent pressure fluid ahead of it toward the exhaust passageway described above. Moving still further ahead among the counterclockwise-moving piston sets, we note that the working chambers between the pistons of sets 32 and 34 have essentially reached their "top dead center" position, while the pistons of set 31 are rapidly overtaking them, closing the gap between sets 31 and 34 to eject all of the pressure fluid through the central exhaust ports 171 on each side of FIG. 12, and bringing these two piston sets 31 and 34 toward face-to-face contact for the beginning of the operating cycle where they will receive pressure fluid from forward auxiliary ports 172.

At the same time, compressed gas is admitted via counterclockwise ports 193, forward valve chambers 176, and forward auxiliary ports 172 into the piston chamber at the upper right and lower left sectors where vane piston sets 32 and 34 are about to separate to begin an intake stroke portion of their operating cycle. As shown in FIG. 12, the piston sets 32 and 34 are at face-to-face contact at the point in their counterclockwise advance where they are shown in FIG. 12, just prior to their arrival at compressed gas intake ports 172. As a result, the compressed gas is admitted between these pistons at a point where it can begin to drive them apart as piston set 32 accelerates away from piston set 34, producing the power stroke of the device.

Self-regulating operation of the motor or pump of FIGS. 8 through 12 is achieved in the following manner. As compressed air is introduced, for example through righthand port 184a into forward connecting passage 184 (FIG. 8) it passes through ports 193 (FIGS. 12 and 12A) into forward valve chambers 176, moving the piston and rod assemblies 178-181 to the positions shown in FIG. 12, compressing the helical coil springs 191 between each piston 179 and its wall 177. The resilient compressive deformation of these springs 191 as shown in FIG. 12 tends to counteract the movement of the piston and rod assemblies from their center position toward the position shown in FIG. 12, thus assuring that the piston and rod assemblies will return to the centered neutral position in FIG. 11 blocking both forward auxiliary ports 172 and reverse auxiliary ports 173 as soon as the pressure differential between the righthand and lefthand connecting passages 184 and 186 is removed by operation of suitable controls, such as control valve 101a shown schematically in FIG. 12A, in order to bring the device to a stopped condition.

Counterclockwise rotation of the vane piston sets in the operating mode illustrated in FIG. 12 occurs in the "forward" mode condition of the device. In order to produce output torque in the opposite direction, the device may be placed in a "reversed" mode of operation by reversal of the control valve 101a to supply compressed air to reverse connecting passage 186. In this reverse mode, the compressed air in passage 186 is admitted by "clockwise" reverse pressure ports 194 shown in FIG. 12a to the spaces between the reverse valve pistons 179 and their transverse walls 177 at each side of FIG. 12 and a corresponding clockwise reverse port 194 (not shown) admits the same compressed air between the piston 179 and its transverse wall 177 at the lower righthand side of FIG. 12, moving the two piston and rod assemblies to positions which are essentially the "mirror image" of their positions shown in FIG. 12, and thereby admitting compressed air through the reverse auxiliary ports 173 to chamber 36 on each side of FIG. 12 in order to produce clockwise rotation of the vane piston sets.

The positioning of the ports relative to the sector-shaped working chamber portion of chamber 36 is determined by the angular position of the fulcrum ring gears 137, and this in turn is controlled by a shifting assembly 204 illustrated in the lower portions of FIGS. 8, 10, 11 and 12. This assembly in the lower portions of FIGS. 8, 10, 11 and 12. This assembly includes a quadrilateral articulating linkage 196 illustrated in FIG. 10 and including the principal ring gears 137 within which the pinion portions 138 of both captive connecting members 139 are engaged to provide the epitrochoid movement of the connecting pins on the captive connecting members 139. Angular shifting movement of ring gears 137 produces angular adjustment in the position of the cusps of the epitrochoid path of these pins and corresponding angular variation of all other intermediate points of the epitrochoid curve, and thus changes the angular position at which the piston sets are brought into face-to-face contact.

In this manner, shifting of all points of the epitrochoid curve results in angular shifting of all points of the entire acceleration-deceleration cycle of operation for all of the vane piston sets in the chamber 36, thus changing the peripheral points in chamber 36 at which all intake cycles begin and end, as well as the peripheral points at which all exhaust cycles begin and end. Accordingly, the resulting angular advance of the starting point for each intake cycle produces earlier intake cutoff during every operating cycle, since the auxiliary ports 172 and 173 remain stationary.

This angular adjustment of all points in the acceleration-deceleration cycles of all piston sets in the devices of FIGS. 8 through 12 is produced by angular adjustment of both ring gears 137 through the shifting assembly 204 illustrated in FIGS. 8, 10, 11 and 12. Each ring gear 137 is provided with concentric annular grooved recesses concentrically and slidingly engaged with annular journal flanges 197 and 198 respectively extending from housing shell 132 and from the crankshaft bearing retainer sleeve 199 secured within each end wall 131 closing the stator housing ends of the device. Each ring gear 137 is free to move angularly about these concentric journal flanges 197 and 198.

Positioning of ring gear 137 is achieved by the parallelogram articulating linkage 196 shown in FIG. 10, where a pair of shift bars 201 form opposite sides of a parallelogram which is completed at the top by gear 137, and at the bottom by a rocking beam 202. As shown in FIG. 10, pivot pins join the upper ends of the shift bars 201 to opposed peripheral points on each ring gear 137. The lower ends of shift bars 201 are similarly joined by pivot pins to the extreme ends of the rocking beam 202.

A longitudinal shifting sleeve 203 is integrally joined at each of its ends to one rocking beam 202 and is journaled for pivoting angular movement in the lower portoin of stator housing shell 132, within the oil sump 144 if desired. As shown in FIGS. 8 and 10, it will be seen that the shifting sleeve 203 is journaled for angular pivoting movement about its own longitudinal axis, which is parallel to the crankshaft axis defined by the bearing mountings of crankshafts 128. Each rocking beam 202 extends transversely in opposite radial directions from sleeve 203, whose angular pivoting movement about its own axis thus causes both end point pivots of each rocking beam 202 to move angularly in a transverse plane perpendicular to the axis of the sleeve 203.

Each pair of shift bars 201 is arrayed in the same common transverse plane with its rocking beam 202 and the associated gear 137. Accordingly, the desired angular adjustment of both gears 137 is produced by angular pivoting movement of sleeve 203 through the articulated parallelogram linkages of the shift bars 201 joining gears 138 to each rocking beam 202.

The required angular rotation of the shifting sleeve 203 is produced by an angular motion-magnifying central portion of the shift lever assembly 204 generally indicated at the bottom of FIGS. 8, 11 and 12. This portion of the shift lever assembly 204 is installed in a space extending across the lower portion of the housing 132 beneath the piston chamber 136. This assembly extends across the entire width of the device, since it is connected to the piston and rod assemblies by means of connecting rods 206 having their upper ends pivotally joined to pivot pins secured to the lower pistons 179 on the right and 181 on the left in FIG. 12, inside sleeves 182.

The lower end of each connecting rod 206 is pivotally joined by a parallel pivot pin to the extreme end of a crank lever 207 whose opposite end is pivotally anchored to the lower portion of the housing 132 in a horizontal-slide mounted pivot anchor block 208, at a point shifting sleeve 203 and the opposite connecting rod 206. Each crank lever 207 is thus mounted to pivot about its pivot anchor block 208 from an upper position shown at the righthand side of FIG. 12 where its connecting rod and piston assembly are moved to their uppermost position, through a path of angular travel to a lowermost position shown at the lefthand side of FIG. 12 where the associated connecting rod and piston assembly are moved to their lowermost position.

At a point approximately halfway along the length of each crank lever 207 from its pivot anchor block 208 toward its connecting rod pivot pin at its free, angularly-movable end, each crank lever 207 is secured by a pivot pin assembly 209 to a shift plate 211 extending radially outwardly from shifting sleeve 203. Pivots pins 209 are joined to the shift plate 211 at diametrically opposite points closely adjacent to the shifting sleeve 203 on which shift plate 211 is keyed for integral angular movement therewith. As shown in FIG. 12, the crank levers 207 are preferably apertured to accommodate shifting sleeve 203, thus allowing the crank levers 207 to swing through their planes of angular movement transverse to the axis of the sleeve 203 without interference therewith.

Angular movement of the shift levers 207 between their uppermost and lowermost positions shown in FIG. 12 produce simultaneous angular movement of shift plate 211, sleeve 203, and both rocking beams 202 through substantially greater angular movements because of the motion amplifying linkage thus provided. This results from the extremely short lever arm between the central axis of sleeves 203 and pivot pin assemblies 209 as compared with the long lever arm between each pivot anchor block 208 and the connecting rod 206 at the opposite end of the shift lever 207. As shown in FIG. 12, angular movement of the shift levers 207 through a range of approximately 20° between their two extreme positions causes simultaneous angular pivoting movement of sleeve 203 and rocking beams 202 of approximately 55°.

In this manner, operation of control valve 101a shifting compressed air from chamber 184 into chamber 186 and producing vertical shifting of the valve piston rods 178 and their asociated piston assemblies between chamber ends 174 and 176 at the two sides of FIG. 12 simultaneously produces substantial angular shifting movement of ring gear 137 through the linkage of FIG. 10 to move all points in the acceleration-deceleration cycles of the vane piston sets angularly within chamber 36, thus shifting the device between its forward and reverse operating modes automatically, in the same manner that mode shifting is automatically produced by operation of control valve 101 actuating the internal valve assembly 71 in the device shown in FIG. 2.

Dimensions of the parts of these articulating linkages 196 shown in FIGS. 8, 10, 11, 12 are selected to provide the exact preferred amount of angular shifting of the piston set cycle points desired for optimum operation of the device at preferred operating pressures of the input compressed air, and the compressible deformation characteristics of the springs 191 and 192 are selected to adjust to the equilibrium conditions of the device at the optimum angular positions of these cycle points in chamber 36. Higher pressures producing further compressible deformation of the springs 191 or 192 have the effect of further shifting the cycle points of the piston sets' operating cycles within the chamber 36, preferably producing quicker intake cutoff tending to adjust for these higher operating pressures. The intake cutoff advance action is further increased by reaction from torque generated by the pistons, providing automatic valving correction to achieve the most efficient operation possible at any pressure and speed reduction selected. Torsional vibrations tending to produce shock loading of the connecting members and associated mechanisms are also absorbed effectively by the heavy coil springs 191 and 192 through the shift lever assembly 204 described above.

ENGINE OR GAS GENERATOR

Figure 1:
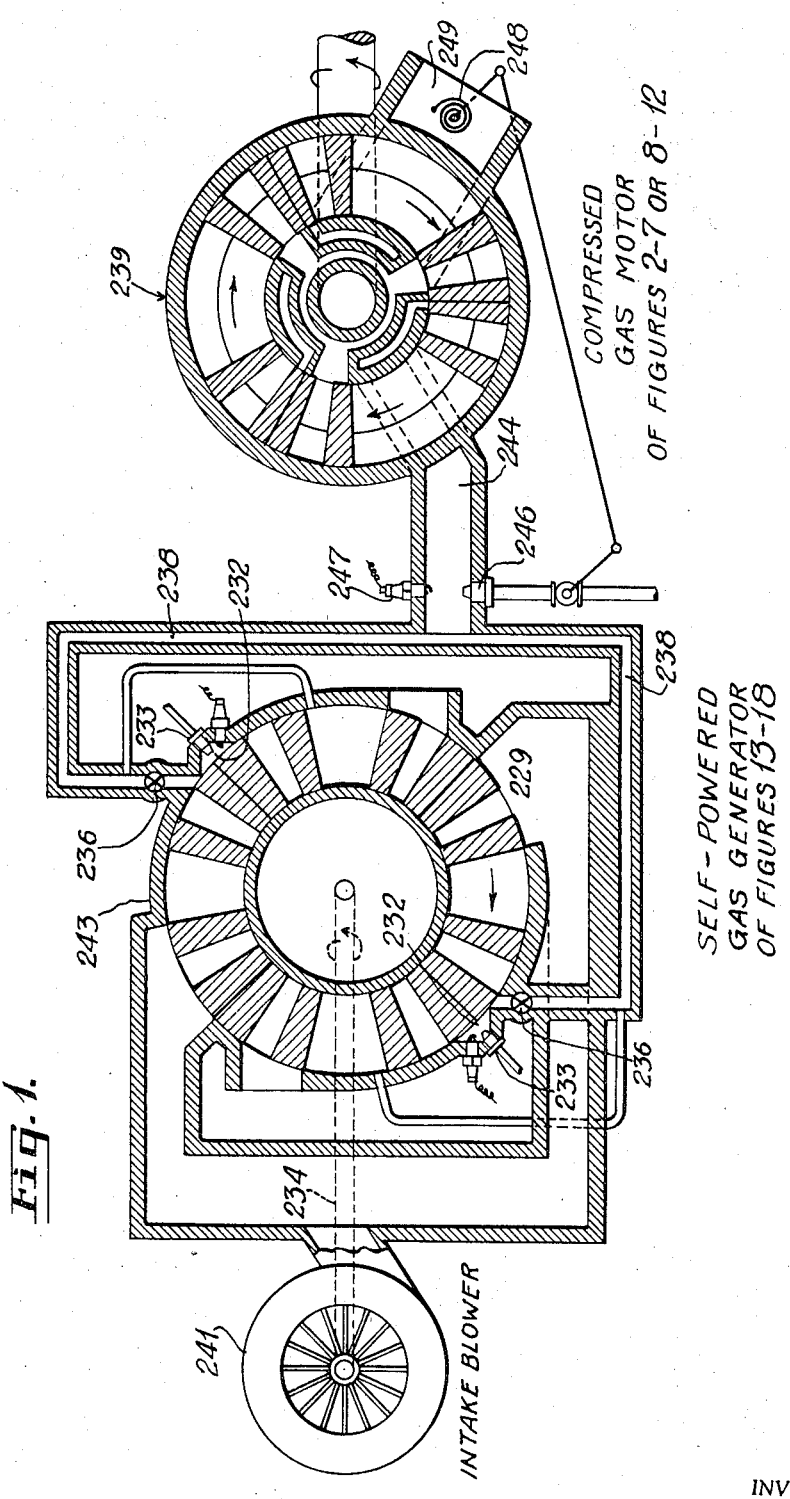
FIG. 1 is a schematic diagram of a power system incorporating the features of the present invention and including a self-powered, self-regulating compressor or gas generator supplying compressed gas to drive a compressed gas motor.

FIGS. 13 through 18 illustrate an engine or gas generator embodying the features and constructions of the present invention, and which is capable of cooperation with the motors illustrated in the previous figures and described in the foregoing paragraphs, in the manner illustrated in FIG. 1. The engine shown in the vertical axial sectional elevation view of FIG. 13 is preferably powered by the burning of a mixture of air and fuel. Air is supplied through intake ports, compressed between the vane piston sets during the approaching, compression portions of their cycle, mixed with fuel by solid injection at this point if not earlier, and ignited by an ignition device such as a spark plug, with the resulting increased pressure provided by combustion supplying the torque required to operate the device.

These vane piston engines may serve as power units to provide output torque alone, and they are well adapted for use in boats, motor vehicles, small planes and the like. However, these devices are preferably employed as self-powered "gas generators" or gas compressors to produce compressed gas drawn off at an intermediate point in the compression portion of the operating cycle, in which a supercharger or intake blower 241 driven by the device is usually employed, as shown in FIG. 1, and such systems will be described in detail below. The compressed gas produced and delivered by these devices may be a fuel-air mixture intended for subsequent combustion at a later point in the travel of this compressed gas through the overall system, further increasing its pressure and thus supplying additional energy for operating a turbine-driven output unit, for driving vane-piston air motor devices such as those described above, or for operating other gas-driven power output units. Alternatively, the compressed gas provided by these devices may be substantially pure compressed air, drawn from the device at an intermediate point in the compression portion of its operating cycle which is prior to the point at which a "solid injection" metered volume of fuel is introduced under pressure into the operating chamber.

This is the form of device shown in FIGS. 13 through 19, enclosed in a stator housing 221 formed in the shape of a cylindrical shell 222 preferably incorporating a cooling water jacket chamber 223 and surrounding an annular piston chamber 36 in which four piston sets 31. 32, 33 and 34 are successively arrayed, each incorporating four vane pistons as shown in FIG. 16. As in the previous embodiments of the invention illustrated in the previous figures, the vane pistons of each set are all secured to respective ring-shaped or sleeve-shaped support members 41, 42, 43 and 44 by which they are connected to the crankshaft 224 through at least one captive connecting member 220 (FIG. 14), and to each other by at least one floating connecting member 225 (FIG. 15), as described in more detail below with reference to the exploded perspective view of FIG. 18. As shown in FIG. 13, both connecting members 220 and 225 are positioned on the same side of the vane piston sets, forming therewith a complete and self-contained drive mechanism.

As indicated in FIG. 13, the crankshaft 224 (FIG. 17) may extend along the entire central axis of the device, being journalled for rotation in suitable rolling bearings mounted within a bearing housing 226 incorporated within in one end of the stator housing 221, with needle bearings on piston end 224a of the crankshaft 224 supporting the piston sets by way of their respective support members.

A crankshaft-supporting bearing 224c secures piston end 224a of the crankshaft in an end plate 227 bolted to the rim of the shell 222 of stator housing 221. This form of the device, illustrated in FIG. 13, is well adapted for use where operating speed are not too great, and reciprocating torques and resulting inertia loads of individual piston sets are consequently not too large. In such installations when the device is positioned with crankshaft 224 revolving about a generally vertical central axis 228, the piston end 224a of the crankshaft extending upwardly through the end plane 227 may serve for starting and engine auxiliary power take-off requirements, while the opposite lower crankshaft end 224b delivers torque for the purpose desired.

When used as a gas generator in systems such as the one shown schematically in FIG. 1, either protruding end of the crankshaft 224 may be connected to drive the intake compressor or blower 241. It is to be noted that since this type of construction leaves one sidewall 227 of annular chamber 36 unobstructed by mechanism, the controllable ports shown in internal hub-wall 37 in FIG. 2 and in the outer chamber wall of FIG. 8 can be easily incorporated in the sidewall 227 of devices of the kind shown in FIG. 13, and may be controlled automatically for reverse operaton and for most efficient operation by means indicated in FIGS. 2 and 8, either singly or in combination.

Alternatively, the device illustrated in FIG. 13 may be modified to incorporate the piston chamber 36, the complete righthand drive mechanism portion illustrated in FIG. 13, and other drive mechanism, to form an engine unit whose lefthand drive mechanism portion is also complete, and is essentially a "mirror image" of the mechanism illustrated in FIG. 13, providing redundancy of these operating parts for additional strength where higher speeds of operation make this advisable. This double-end drive mechanism unit would then be generally similar to that shown in FIG. 8.

The operating parts of the drive mechanism governing the acceleration and deceleration of the vane piston sets in the device of FIG. 13 are illustrated in the successive sectional views of FIGS. 14, 15 and 16, in which these parts are given the same refrence characters as corresponding parts in the motor or pump embodiments of these vane devices shown in the previous figures and described in the foregoing paragraphs. These piston-controlling portions of the mechanism are illustrated in the exploded perspective view of FIG. 18, where their interfitting relationships and cooperation are shown as described in detail below.

FIG. 16 is a cross-sectional view of the same device taken on the offset plane 16—16 shown in FIG. 13, passing generally through the center of piston chamber 36, and this FIG. 16 shows the intake and exhaust ports of the device, and their flanking angular proximity to the operating cycle points of minimum separation of the vane pistons in the four clockwise-moving four-piston sets. In the four stroke or intake-power-exhaust internal combustion cycle employed in this engine, two intake ports 229 are positioned on the outer peripbery of the housing shell 222, as shown at the upper left and lower right portions of FIG. 16. Rotation of the vane pistons in the annular chamber 36 proceeds in a clockwise direction in FIG. 16. Exhaust ports 231 are positioned just "ahead" of, or directly adjacent counterclockwise to, the intake ports 229.

In FIG. 16, the vane pistons of piston set 32 are shown at the minimum velocity position in their operating cycle. The vane pistons of piston set 33 are shown approaching behind and decelerating toward their closest approach to the pistons of set 32, at which their actual forward velocities will be matched, while the diminishing sector space between the upper left pistons of sets 32 and 33, as well as the corresponding sector space between the lower right pistons of these sets, are both being exposed to the exhaust ports 231. As the piston sets continue their clockwise movement about chamber 36, and reach their point of closest approach at which they may actually reach face-to-face contact if desired, they pass the end of exhaust port 231 and the position occupied by the piston set 32 in FIG. 16. In the positions shown in FIG. 16, the forward vane pistons 34 have begun their accelerating advance away from the minimum velocity position occupied by the vane pistons 32.

Upper left and lower right pistons of sets 34 and 31 are shown partway through their intake cycle in FIG. 16, exposing a substantial and increasing sector-shaped portion of chamber 36 to the air introduced through intake ports 229. Continuing in a clockwise direction around chamber 36, it will be noted that in the upper right and lower left sector spaces between the pistons of sets 31 and 33, the device is compressing the gas enclosed therein in annular piston chamber 36 as the upper right and lower left pistons of piston set 33 decelerate toward their minimum velocity position, while the upper and lower pistons of set 31 are moving at maximum velocity and changing from acceleration to deceleration.

BY-PASS FIRING CHAMBER

The upper right and lower left pistons of sets 33 and 32 contain between themselves the compressed charge previously drawn in through intake ports 229 and compressed in the manner just explained, and this compressed charge is exposed at the periphery of chamber 36 to by-pass firing chambers 232 occupying angular sectors of the periphery of chamber 36 encompassing slightly more than the full angular width of the invidual vane pistons of the piston sets. Firing chambers 232 are positioned at the point of minimum velocity in the vane pistons' operating cycle. Each firing chamber 232 thus conducts the compressed charge around one vane piston 32 in a forward direction, admitting it to the space between this minimum velocity piston 32 and the piston 34 directly ahead of it, as shown in the upper righ and lower left portions of FIG. 16. These vane pistons of sets 34 are already accelerating forwardly away from the pistons 32 following them, and the delay in utilizing the compressed and ignited charge caused by "top dead center" dwell of the pistons 32 is thus reduced or eliminated in effect by the by-pass firing chamber 232. At this point, the compressed charge is contained between pistons 33 and 34, with spaces between each of these pistons and pistons 32 providing space for the compressesd gases before firing, making it unnecessary to leave space for this purpose between the vane piston which would reduce the effective intake displacement of the device. As the sector spaces between pistons 33 and 32 are reduced, those between sets 32 and 34 increase until ,when the vane pistons of sets 33 and 32 actually meet face-to-face,, all of the charges have been transferred forward to the spaces between pistons 32 and 34 to drive set 34 onward in the power stroke If the air introduced through intake ports 229 is not already mixed with fuel in a carburetion system not shown in the figures, a metered volume of fuel is introduced through the fuel injector nozzles 233 positioned in each firing chamber 232. Suitable ignition devices such as the spark plugs 234 are mounted in the firing chamber 232 with their gaps exposed to the combustion chamber between the pistons of sets 32, 33 and 34, the latter of which are already accelerating to begin the expansion or power portion of the operating cycle of the device.

In FIG. 16 the right and left vane pistons 31 are shown at their maximum velocity positions, followed by the upper right and lower left vane pistons of piston set 34, each of which is partway through the acceleration portion of its operating cycle; the sector portions of annular piston chamber 36 contained between these vane pistons contain the expanding charge which is providing the torque driving the vane pistons of set 31 forward.

In FIG. 16, the lower right and upper left vane pistons 33 are decelerating as they approach the vane pistons of set 32 directly ahead, and the pistons of sets 31 and 33 enclose between themselves the portions of the chamber 36 in which the exhaust portion of the operating cycle is occurring, expelling exhaust gas through exhaust ports 231. The upper left and lower right pistons 33 and 32 enclose between themselves the portions of chamber 36 in which the exhaust portion of the cycle has been substantially completed, with the exhaust gas therebetween having been expelled through exhaust ports 231.

As these four sets of vane pistons continue their acceleration and deceleration movement clockwise about chamber 36 in FIG. 16, they begin each new operating cycle by receiving and drawing in the fresh gas supplied through intake ports 229 into the space between the vane pistons of sets 32 and 34 to begin the intake portion of the operating cycle in the manner already described. As shown in FIG. 1, a supercharger or intake blower 241 is preferably employed to increase the air intake, providing extra air beyond that needed for the power strokes.

COMPRESSED GAS BLEED CONDUIT

As shown in FIG. 16, a compressed gas delivery check valve 236 is positioned on the periphery of piston chamber 36 at a point "just ahead" of, or adjacent counterclockwise to, each by-pass firing chamber 232. Check valves 236 are resiliently biased into closed positions by compressed coil springs 235 sandwiched between each valve member 236 and adjustable regulating back-up plugs 237 threadedly engaged in a threaded opening in shell 222 directly behind each check valve 236, and thus providing an adjustable gas delivery pressure at which the check valve 236 opens to deliver compressed gas from the piston chamber 36 via a compressed gas delivery conduit 238 to a storage reservoir or accumulator, or to compressed gas driven units such as a turbine or one or more of the compressed gas motors shown in the previous figures, in the manner shown in the schematic system diagram of FIG. 1.

Adjustment of the back-up plug 237 to vary the compression force stored in the spring 235 permits corresponding adjustment of the pressure at which compressed gas will be passed by the check valve 236. This delivery pressure may thus be adjusted to insure minimum compression pressure and volume of retained air necessary for continued and proper operation of the gas generator. Pressure and volume of air above this necessary minimum will be released by the check valves 236 to the storage reservoir or accumulator.

The amount of torque available in this gas generator for gas compression purposes tends to be self-regulatory, since the higher the pressure of compressed gas released by valves 236 and fed out via delivery conduit 238, the greater the pressure of remaining gas in the firing chamber, and the greater the effectiveness of the power strokes to supply the increased torque demanded to supply compressed gas at high pressure. Conversely, a lower pressure delivered in output air via conduit 238 (down to the minimum permitted by check valves 236) means lower firing chamber pressures and weaker power strokes.

In addition, the usual velocity-sensitive throttle and pressure regulating controls familiar to the art will normally be used with these gas generators, supplemented by the foregoing self-balancing operation characteristics.

COMPRESSED GAS BY-PASS CONDUITS

As indicated in FIG. 1 and also in FIG. 16, a compressed gas by-pass conduit 242 connects the gas delivery conduit 238 to a point "ahead" of the by-pass firing chamber 232, by-passing the firing chamber 232 to a "downstream" point in the piston chamber 36 at which the vane pistons have partially completed the expansion portion of their operating cycles. While it is heated by its compression, this gas delivery by the by-pass conduit 242 is substantially cooler than the combustion products expanding in the combustion portion of the operating cycle. Admission of compressed gas from conduit 238 at this "downstream" point thus provides both cooling of the chamber and additional driving torque, supplementing the output torque being supplied by the expanding charge without increasing the temperature of the generator. This action corresponds to that performed by the by-pass fans in conventional aircraft jet engines. A valve 242a interposed in conduit 242 controls the amount of by-pass gas so delivered.

IMPROVED SCAVENGING ACTION

As a result of the by-pass firing chamber 232 construction, as described earlier, the approaching pistons may be dimensioned to bring them substantially or completely into face-to-face contact just as they are leaving the exhaust port 231 and passing the initial edge of the intake port 229, moving from the positions of upper left and lower right vane pistons 33–32 toward the pistons of vane pistons 32–34 in FIG. 16, so that greatly enhanced scavenging action takes place. As a result, the entire volume of the chamber sector between the approaching, contacting pistons is expelled through exhaust port 231, producing substantially complete scavenging of all combustion products from the device.

A desirable consequence of this excellent scavenging operation is the availability of compressed air delivered by the delivery conduit 238 from the check valve 236 at an intermediate point in the compression stage of the operating cycle of the device with no substantial contamination by the exhaust products of prior combustion cycles.

In the specific preferred gas generator embodiment of the invention illustrated in FIGS. 13–18, the four sets of vane pistons each have four, equally-spaced vane pistons 11°–15′ in angular width. The minimum angular distance between approaching pistons was designed to be zero degrees zero minutes. The maximum angular distance between adjacent piston faces was designed to be 25 degrees 14 minutes 6 seconds. Displacement from each revolution of the piston assembly in this device is 4.48 times the volume of the ring cylinder 36 swept by the vane pistons. Displacement per piston assembly revolution using the four-stroke cycle is 2.24 times the volume of the ring cylinder 36 swept by the vane piston. The maximum angular deviation of individual piston sets from their rotational norm during cyclical acceleration and deceleration is 8°46′59″ in this embodiment.

In choosing the details and construction of this kind of displacement unit, radial balance of the zones of maximum operating pressure in chamber 36 is important to avoid undue friction, and this can be achieved with any pluraltiy of vane pistons per set, where the device is to be used as a compressible fluid motor or pump. Experience indicates that the choice of three vanes per piston set provides the most rugged construction and also produces maximum displacement for a given size unit. For this reason, three vanes were chosen in each piston set in the first embodiment device, illustrated in FIGS. 2 through 7. However, in order to get radial pressure balance in engines using the four-stroke cycle, a minimum of four vanes per piston set must be employed in order to have equal-pressure points diametrically opposite each other in such a device, permitting balancing of the high pressures produced by ignition and combustion of the fuel-air mixture.

VEHICLE PROPULSION SYSTEMS

As shown in FIG. 1, the gas generator 243 shown in FIGS. 13–16 is adapted to deliver compressed gas via gas delivery conduit 238 to a motor 239, which may be a motor of one of the vane piston types described in the foregoing paragraphs and illustrated in FIGS. 2–12. It will be understood that the gas generators of this invention may be used with other forms of motors or as a source of compressed fluid for other purposes, such as pneumatic tools, and the motors of this invention can be used with steam or any other source of compressed fluid for any ue for which any other form of positive displacement motor unit is useful.

The motor 239 shown in FIG. 1 is schematically illustrated with internal valving, representing the internally valved motor shown in FIGS. 2–7. In the system of FIG. 1, fuel is introduced by fuel injector nozzles 233 directly into the by-pass firing chambers 232, and no fuel is introduced through the intake ports 229. Accordingly, compressed air drawn through valves 236 into gas delivery conduit 238 is substantially pure air, uncontaminated by combustion exhaust products.

In the system of FIG. 1, compressed air in conduits 238 being delivered to the motor 239 passes a second fuel injector 246, and a second ignition device such as the spark plug 247 is provided in conduit 244, with the amount of fuel fed to this second fuel injector 246 being controlled directly by a bimetallic or other temperature sensor unit 248 positioned in the exhaust outlet 249 of the motor 239, supplemented by a pressure-sensitive device (not shown) if desired, so that the exhaust of motor 239 is maintained approximately at or just above atmospheric temperature and pressure to avoid power loss. This secondary burning can also be used for momentary temporary increase of power for emergency purposes, and would thus correspond to the afterburners used in aircraft turbine power plants.

The unusually high displacement for given size and weight of the devices of this invention coupled with the overlapping of the effective chamber sector volumes between successive pairs of vane pistons as they accelerate and decelerate around the piston chambers 36 provide unusually high output torque per unit of weight in these devices. The driving torques produced by the systems of this invention employing drive units small enough to fit within the wheels are ample to propel such a vehicle as an automobile, a truck or a bus, and in such vehicles the drive system of this invention actually occupies less space than the internal combustion engine and transmission systems in conventional automotive vehicles. In vehicles having wheels each driven by separate, independent motor drive units in the system shown schematically in FIG. 1, torque multiplication according to need is achieved by the compressibility of the driving fluid. The automatic switching of valving in the motor embodiments described above in response to manual actuation of the controls 101 or 101a of these motors permits powerful dynamic braking and effortless reversing operation of these systems.

RADIALLY ARRAYED SUPPORT MEMBERS WITH SEALING RING LUBRICATION

In each of the illustrated embodiments of the invention, two or three of the support members for the vane piston sets include radially arrayed annular components. This construction provides pressure-tight sectors for the regions of the annular piston chamber 36 enclosed between each successive pair of vane pistons, because these radially arrayed structures are in sliding rotary contact with each other. Sealing rings similar to conventional piston rings are positioned in recessed peripheral grooves formed in the inner member of each radially arrayed pair of structural members. These sealing rings extend radially from their recessed peripheral grooves to bring their rim surfaces into sliding contact with the internal peripheral surface of the radially adjacent member.

Thus, in the internal valve motor device shown in FIG. 2, the external periphery of the hub portion 37, formed on the shiftable hub valve member 92 (FIG. 2A) in the valve assembly 71 is provided at each end with a pair of recessed grooves 251 incorporating these sealing rings 252. As shown in FIG. 2, the rims of the sealing rings in hub portion 37 bear directly against the internal periphery of the two innermost support members 41 and 42, each of which is likewise provided with three recessed ring grooves 41k and 42k encircling its external periphery. Similar sealing rings are provided in these grooves with their rims bearing against the internal periphery of the auxiliary support members 41a and 42a, which are likewise provided with similar sealing rings 41ak and 42ak mounted in ring grooves encircling their outermost external periphery and having their rims in sliding contact bearing against the internal periphery of the two outermost support members 43 and 44, which are also provided with similar sealing rings 43k and 44k in sliding contact with a guide sleeve 45. The angularly shiftable hub valve member 92 is also mounted on a hub portion of the housing end wall 38 which is provided with similar sealing rings mounted in recessed grooves.

Turning to FIG. 8, the externally valved motor device there shown is provided with similar radially arrayed support members. As there shown an internal guide sleeve 130 is formed as a central hollow cylindrical member having a central bore 126 communicating between similar driving mechanisms flanking both sides of the annular piston chamber 36 to avoid the possibility of any pressure differential existing relative to either side of the piston assembly. A first inner annular support member 41 integral with the vane pistons of piston set 31 is shown at the right hand side of the drive sleeve 130. A similar mirror image ring shaped support member 43 having a similar construction is mounted at the left end of the guide sleeve 130. The central portion of the guide sleeve 130 is provided with a radially extending peripheral platform incorporating recessed sealing ring grooves accommodating sealing rings 130k whose rims bear upon the underside of flanges formed in the support members 41 and 43 at their central abutting edges. Similar flanges formed along the opposite outer edges of the support members 41 and 43 are in sliding engagement with sealing rings 42k and 44k mounted in recessed grooves formed in underlying axial flanges extending from the first lateral support members 42 and 44 flanking the internal radial side portions of all vane pistons in the piston sets. These support members 42 and 44, as well as the two radially arrayed support members successively juxtaposed outside them along the radial sides of the vane pistons, identified by the reference characters 41a and 42a on the left side of the vane pistons and the numbers 43a and 44a on the right side of the pistons, are all similarly provided with recessed grooves accommodating sealing rings along their outermost external peripheral surfaces. It is noteworthy that each set of vane pistons is provided with a two-part support member. Thus, vane piston set 31 is provided with support member 41 integrally joined to the vane pistons of set 31 along their right inner edges, and also with the auxiliary support member 41a solidly bolted to these vane pistons midway along their left radial edges. Vane piston set 32 is provided with inner right support member 42 and the outermost left auxiliary support member 42a. Vane piston set 33 is provided with the support members 43 and 43a, the mirror image of support members 41 and 41a. Vane pistons of the set 34 are provided with inner support member 44 and auxiliary support member 44a, the mirror image of support members 42 and 42a. In FIGS. 13 and 18 the external recessed ring grooves to receive rings 43k and 44k, formed in the support members 43 and 44, are clearly shown and a comparison of these figures will serve to explain more fully the interfitting relationship of these support members with their external sealing rings. The innermost support members 41 and 42 shown at the left side of FIGS. 13 and 18 form a two-part hub portion inside the annular piston chamber 36 with support member 41 being mounted on needle bearings upon the left end 224a of the crankshaft 224, concentric with the principal axis 228 of the device.

Support member 41 is provided with a shoulder having an external periphery incorporating two sealing ring grooves whose rings 41k bear against the internal periphery of the interfitting surrounding portion of support member 42, all as shown in FIG. 13. An underlying flange portion 43j of support member 43 fits within an axial recess in support member 42. The flange portion of support member 43 is provided with grooves accommodating sealing rings 43k bearing against the outer periphery of the recess in support member 42. Flange 43a is clearly shown in FIG. 18 extending axially inside the locus of the vane pistons integrally mounted on support member 43. Surrounding the external periphery of support member 43 are two additional sealing ring grooves accommodating rings 43k bearing against the internal periphery of support member 44 whose external periphery is likewise provided with sealing ring grooves accommodating rings 44k whose rims are in sliding contact with the internal periphery of the concentric cylindrical shell 222 of the stator housing 221.

Thus, in each of the devices embodying the features of this invention, it will be seen that the radially arrayed portions of the drive mechanism positioned at one side or both sides of the annular piston chamber 36 are positioned for concentric sliding relative rotary motion or oscillating motion. These support members are guided by stationary central hub units or crankshaft segments, and they are positioned within concentric housing shells forming multiple unit assemblies of numerous parts all serving to guide and position each other in interfitting relationship, while being free for low friction sliding relative movement to facilitate the relative acceleration and deceleration of the vane piston sets in the annular piston chamber 36, and to control this relative angular piston movement as required in the operation of these devices.

Splash lubrication in each drive mechanism supplies ample lubricating oil to all of these sealing ring assemblies. At certain points around the periphery of these assemblies the annular piston chamber 36 encloses a sector region of low pressure once or several times during every operating cycle, tending to draw in lubricant between the sealing rings and the surfaces on which they ride under the influence of atmospheric pressure in the drive mechanism region outside of these sealing ring assemblies. At certain other points around the periphery of the annular piston chamber 36, regions of high pressure are enclosed between successive pistons of the moving vane piston sets at one or more times during each operating cycle of the devices. In these regions of high pressure, the lubricant is forced outwardly away from the annular piston chamber. The sliding relative angular motion of these various interfitting support members concentrically about the central axis of the device causes lubricant drawn in at regions of low pressure to be moved around the periphery of the sealing rings toward the regions of higher pressure, and a continuous advancing film of oil thus lubricates all sliding surfaces between the support members and the concentric housing shell. Furthermore, while the sealing rings furthest removed from the annular piston chamber receive larger quantities of lubricating oil and the sealing rings closest to the annular piston chamber receive lesser quantities of lubricating oil, a highly desirable result is achieved by this inequality of lubrication. The sealing rings receiving the least lubricant tend to burnish themselves and polish the external surfaces along which they ride until the rings and their seats have honed each other to a smooth finish. In this way, these innermost sealing rings provide excellent pressure sealing action tending to isolate the working sections of the annular piston chamber.

In addition, by regulating the working pressure trapped in the drive mechanism portion of the housing shell, the average movement of oil to or from the working chamber 36 past the sealing rings can be adjusted for maximum lubrication with minimum oil loss into the working chamber. This adjustment can be made by regulating the pressure trapped within the housing shell by such means as the adjustable pressure check valve 253 shown in FIG. 13. This same regulation of pressures in the drive mechanism region is also useful for reducing unbalancel lateral pressures on bearings where unbalanaced conditions exist.

In order to avoid the accumulation of lubricating fluid in the annular chamber 36, the splash lubrication zone of the drive mechanism to which the "open" sides of all connecting members are exposed should be provided with drain passages 254 leading to an underlying lubricant sump. When the rotary devices of this invention are not in rotation, lubricting fluid will thus be drained into the sump to assure that lubricating fluid will not be trapped at the bottom of the annular chamber where it might interfere with the face-to-face approach of adjacent vane pistons.

DRIVE MECHANISMS WITH ONE OR MORE FLOATING CONNECTING MEMBERS

FIG. 18 shows an exploded perspective view of the principal moving parts of the gas generator device shown in FIG. 13, these being the parts fitting within the annular chamber 36 and beside it to form the drive mechanisms supporting the piston sets. These successively interfitting moving parts are arrayed substantially in the order in which they are assembled to construct the device shown in the axial vertical sectional view of FIG. 13.

At the lefthand side of FIGS. 13 and 18, piston sets 31 and 32 are shown supported by their internal hub-type support members 41 and 42. Progressing to the right in FIG. 18, vane piston set 34 is next shown, mounted on the ring-shaped support member 44 integral with the vane pistons of set 34. The vane pistons of set 33 are next shown, mounted on a compound type support member 43 incorporating an axially extended flange portion 43j combined with a lateral side portion 43 to which the vane pistons 33 are integrally joined.

Figure 18A:
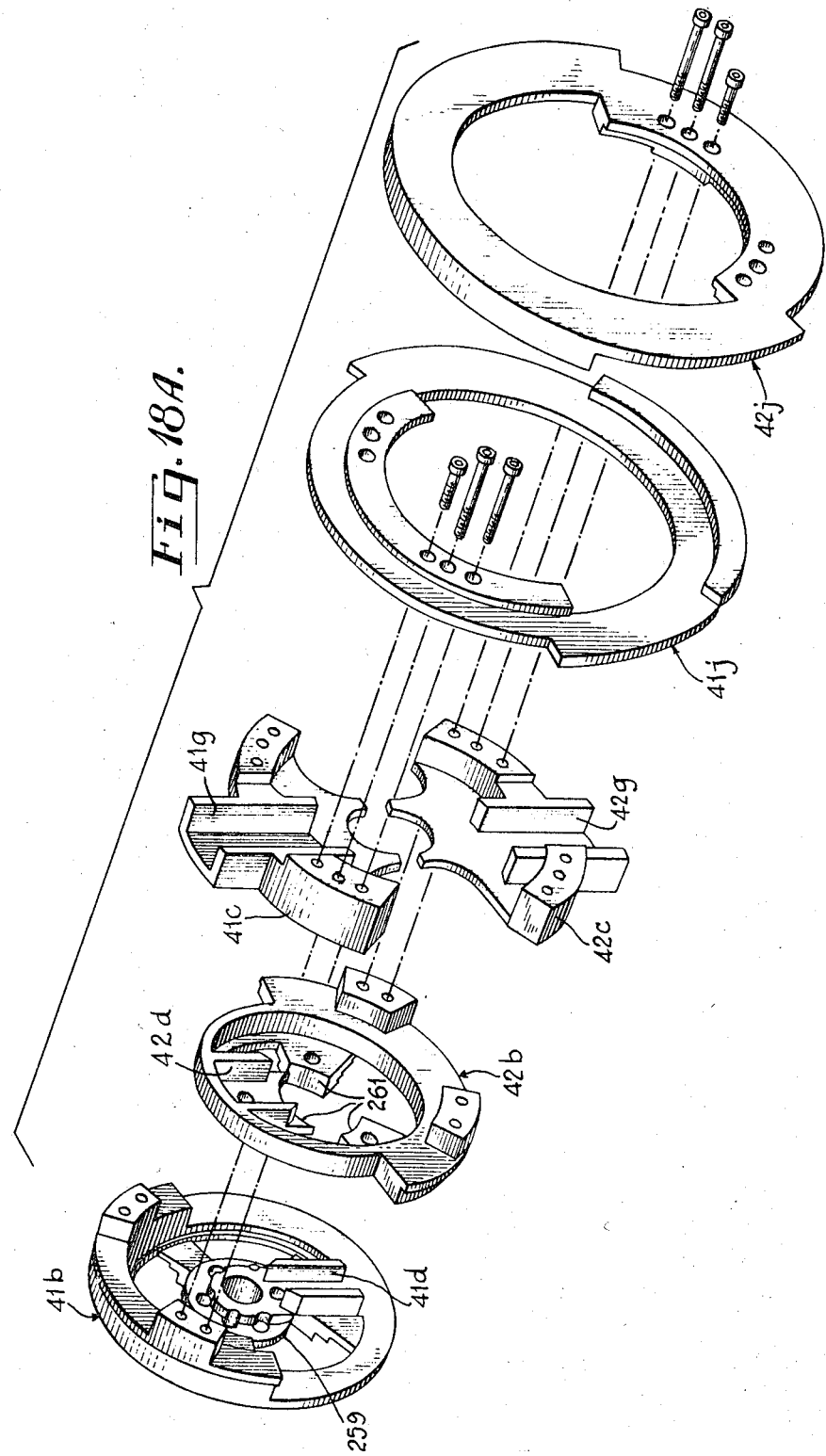

The assembled flange portions of the driving support members for piston sets 31 and 32, identified by the reference characters 41bc, 41c, 42b and 42c, are next shown interfitted together in their assembled position in the middle of FIG. 18; the separate components of this interfitted sub-group of support members 41 and 42 are shown in FIG. 18A.

The inner hub portion of member 41b in this assembled group of support members incorporates a central boss 259 bolted directly to the internal hub portion 41 shown in FIG. 13 and appearing in the central portion of the assembly of the piston sets 31 and 32 shown at the left end of FIG. 18. Just outside of the central boss 259 of member 41b, the flanges are cut away in sector apertures to receive sector bosses 261 of member 42b, which extend therethrough and are bolted rigidly to hub portion 42, as shown above internal hub portion 41 in FIG. 13. It will be noted in the central portion of FIG. 18 and also in FIG. 13 that the bolts joining these support members 41b and 42b to the hub portions 41 and 42 form two concentric rings of bolts, the inner ring of bolts joining the parts 41 and 41b of the support member for set 31, and the outer ring joining the parts 42 and 42b of the support member for set 32, with angular clearance being provided between the interfitting portions of the support members 41b and 42b to provide the desired angular relative movement of these piston sets and their integrally joined support member assemblies. The connecting sector boss portions 261 of support member 42 thus extend through these enlarged, sector shaped openings in the flange portion 41b of support member 41.

The floating connecting member 225 shown in the lower portion of FIG. 18 is positioned to be connected to the support members of all four piston sets. This floating connecting member 225 is provided with two diametrically opposite pivot pins 41f and 42f extending to the left for respective connection via pillow block assemblies 41e and 42e with central radial guideways 41d and 42d formed in the righthand faces of respective flange portions 41b and 42b of support members 41 and 42.

Projecting from the righthand side of floating connecting member 225 are two additional pivot pins 43f and 44f, similarly connected via pillow blocks 43e and 44e mounted in left-facing radial guideways 43d and 44d formed in guideway flange members 43b and 44b, which are respectively bolted to the ring-shaped, vane piston-bearing support members 43 and 44. These flange members 43b and 44b are shown in the righthand central portion of FIG. 18, where it will be seen that they are each provided with two radial guideways, the first, inner, left-facing radial guideways 43d and 44d engaging the floating connecting member 225 (FIG. 15), and the second, outer, right-facing radial guideways 43g and 44g respectively, opening to the right for engagement with captive connecting member 220 (FIG. 14).

It will be noted in the righthand portion of FIG. 18 that the two radial guideways on each of the members 43b and 44b are directly opposed diametrically, as well as being on opposite faces of these flange support member portions facing in opposite directions to cooperate with different connecting members.

Near the extreme right of FIG. 18 are two arc sector guideway flanges 41c and 42c, each incorporating outer radial guideways 41g and 42g, both facing to the right for cooperative engagement with the captive connecting member 220. The arc sector flange portions 41c and 42c are both bolted to the flange portions 41b and 42b of the support members for the piston sets 31 and 32. The arc sector flange portion 41c is shown in dashed lines in this assembled bolted position in the middle of FIG. 18, and is also shown in solid lines at the righthand end thereof, as well as in the exploded perspective view of FIG. 18A. These sector flange portions 41c and 42c incorporate outer right-facing radial guideways 41g and 42g similar to guideways 43g and 44g on members 43b and 44b, all positioned for cooperation with the captive connecting member 220 (FIGS. 14 and 18A).

Thus as shown in FIG. 14 and the lower righthand portion of FIG. 18, the captive connecting member 220 is provided with four integral pivot pins projecting to the left. The lowermost pivot pin 42i cooperates via a pillow block 42h (FIGS. 13, 14) with the radial guideways 42g in the arc sector guideway flange 42c shown at the righthand end of FIG. 18. The uppermost pivot pin 41i directly opposite pivot pin 42i on the periphery of captive connecting member 220 cooperates via pillow block 41h (FIGS. 13, 14) with the radial guideway 41g formed in an arc sector guideway flange 41c at the upper righthand end of FIG. 18. The guideways 41g and 42g are also clearly shown in FIG. 18A.

In a similar manner the pivot pin 43i of captive connecting member 220 shown in the foreground of FIG. 18 is connected via pillow block 43h (FIG. 14) in radial guideway 43g formed in the flange portion 43b of the support member 43 connected to the piston sets 33. Likewise, the opposite pivot pin 44i on captive connecting member 220 is similiarly connected to the radial guideway 44g in flange portion 44b of the support member 44 connected to the piston set 34.

This assembly of FIGS. 13–18 corresponds generally to the driving mechanism shown previously for the air motors of FIGS. 2 through 7 and 8 through 12, but the relative angular motion of individual piston sets is less than in those versions. Advantage was taken of this lesser relative angular motion to extend the driving pin connections with the captive gear-driven connecting member 220 by means of sector bosses extending through sector apertures in flange portions 43b and 44b from arc sector flanges 41b and 42b, thus connecting all piston sets to the captive gear-driven connecting member 200 and eliminating the need for any connecting member on the opposite side of the annular chamber 36.

However, obviously all the piston sets must have substantially equal torsional inertias, or vibrational problems will occur during the operation of the device. The construction mentioned in the paragraph above results in a very much lower inertia for the piston sets 31 and 32 since they have lightweight hub-type support members 41 and 42 by comparison with the much heavier flanged support members 43 and 44, as is shown in FIG. 18. To offset this difference in inertias therefore counterweight flanges or balancing rings 41j and 42j are necessary to provide the weight metal required for balancing the inertias of these two parts 41 and 42 with the inertias of parts 43 and 44. These counterweight flanges are bolted to the arc sector guideway flanges 41c and 42c of the support members 41 and 42, as shown in FIG. 18A, and advantage is taken of these counterweight flanges extending axially beyond both connecting members to provide a separate thrust area to transmit thrust loads from the piston assembly to the stator housing 222. These balancing rings of counterweight flanges while particularly needed in this version of the device embody a principal which is useful in all other versions since inertia balance is an absolute necessity for all such types of devices.

Comparing the air motor of FIG. 2 with the gas generator of FIGS. 13–18, the two captive connecting members 47 and 58 in FIG. 2 are essentially a split version of the single captive connecting member 220 of FIG. 18, since connecting member 47 is provided with two pivot pins 41i and 42i while the ungeared second captive connecting member 58 also mounted on crankpin portion 59 of the same crankshaft 51 is provided with the other two pivot pins 43i and 44i. It will thus be seen that these two captive connecting members 47 and 58 together perform the same function as the single captive connecting member 220 in FIG. 18. Both versions have a single floating connecting member 225 in FIG. 18 and 46 in FIG. 2, the only difference in the two cases being one of size and general configuration. These floating connecting members differ primarily in size, and as shown in FIG. 4 the floating connecting member 46 is a ring-shaped structure having its two pivot pins 41f and 42f protruding toward the viewer while its pivot pins 43f and 44f protrude rearwardly in the opposite direction away from the viewer. The relative position and configuration of these oppositely projecting pivot pins is thus the same in the floating connecting member 46 of FIG. 4 and in the floating connecting member 225 of FIGS. 13 and 18.

The air motor embodiment shown in FIG. 8 illustrates the use of duplicate drive mechanisms, each consisting of one captive and one floating connecting member; these duplicate drive mechanisms are positioned on each side of the piston assembly if desired. In FIGS. 8–12, the two captive connecting members 139 on each side of the annular chamber 36 are connected only to alternate pairs of pistons, and thus together perform the function of the single captive connecting member 220 shown in FIG. 18, for example, but with separate driving gears for each.

In FIG. 4 of my Pat. 3,241,531, for example, a floating connecting member 72 is shown schematically, in combination with two separate, captive, gear-driven connecting members 38 and 43 on opposite sides of the vane piston sets, each engaged by trammel gear means 42a and 47a with the stator housing of the device and both being required to provide the driving connection of the piston sets with separate crankshafts 22 and 23.

By contrast, the devices here illustrated in FIGS. 2–7 and 13–18 employ the basic combination of a single floating connecting member and a single captive connecting member both on the same side of the piston chamber, as illustrated in FIG. 18. However, these connecting members may be structurally separated in the different ways illustrated in the other figures hereof. For example, the captive connecting member 220 of FIG. 18 has been "split" in FIG. 2 in the two captive connecting members 47 and 58, cooperating with the single floating connecting member 46.

Further comparing the "split" captive connecting members of FIGS. 2 and 8, it will be noted that the only the first captive connecting member 47 is provided with the ring gear-pinion engagement with the stator housing in the embodiment of FIG. 2, while the second captive connecting member 58 engaging the other two piston sets is ungeared but is rotatably mounted on crankpin portion 59 of the same crankshaft 51 which supports the first geared captive connecting member 47 on its crankpin portion 49.

"Split" captive connecting members engaging alternate pairs of piston sets need not be mounted for rotation on crank pins of the same crankshaft when two separate crankshafts are employed, such as crankshafts 128 in the embodiment of FIG. 8. In the structure shown in FIG. 8, the driving mechanism on each side of the piston chamber is not complete in itself, as it is in the other forms of the device shown in FIGS. 2–7 and 13–18. In this respect FIG. 8 represents a device similar to that disclosed in my Pat. 3,241,531 not incorporating the one side drive mechanism having a single captive connecting member and a single floating connecting member, both on the same side. However, this version of my device illustrates the usefulness of external valving assemblies of the kind shown in FIGS. 12 and 12a, and the feasibility of employing duplicate drive mechanisms on each side of the piston channel each of which may or may not be complete in itself.

In the embodiment shown in FIGS. 2 through 7 and in the embodiment shown in FIGS. 13 through 18, however, the drive mechanisms are entirely complete and positioned entirely on one side of the piston assemblies. In each of these embodiments, a single floating connecting member cooperates with a single geared captive connecting member or its functionally equivalent structure, such as the divided or "split" connecting member 47–58 shown in FIG. 2. In contrast to my previous Pat. 3,241,531, the present invention represents a construction which makes possible a complete one-side driving mechanism, incorporating basically one captive, rotationally controlled connecting member or the structural and functional equivalent connected to all piston sets, and one floating connecting member which must also be connected to all piston sets, to provide together on one side of the piston chamber a complete, balanced and mechanically practical driving structure which has not been achieved previously.

In comparison with the devices of FIGS. 2–7 and 13–18, the device of FIG. 8 differs in that it does not have a complete driving mechanism on each side of the piston assembly in the annular piston chamber 36. A device of the kind shown in FIG. 18 where both a floating and a captive connecting member are positioned on the same side of the vane piston sets—where complete control of each piston set occurs in a relatively small axial area by way of drive pins and pivotable slidable pillow block bearings all substantially in the same transverse plane, and on only one side of the vane pistons—avoids distortions, which otherwise occur in the necessarily large supporting and drive mechanism areas and the support members forming the sidewalls of the piston assembly, and therefore avoids a source of friction which for practical purposes has been disastrous in previous constructions.

Major distortions occur when separate parts of a complete drive mechanism are located on different sides of the annular piston chamber, for crankarm loads, not being in the same plane or close thereto, tend to try to rock the piston assembly and to warp the support member flanges which may encompass substantial spans across the interior of the stator housing. The resulting distortions of the necessarily thin, lightweight ring chamber sidewall support member flanges produces highly undesirable increases in the friction between the sliding parts, resulting in excessive bearing loads to offset this and increased wear in bearings and contact surfaces. Such distortions, friction drag and wear are substantially avoided in the one-side drive mechanisms of the present invention.

While the objects of the invention are efficiently achieved by the preferred forms of the invention described in the foregoing specification, the invention also include changes and variations falling within and between the definitions of the following claims.

I claim:
1. In an alternately-accelerating rotary piston device of the character described, including a stator housing containing an annular chamber, the combination of:
   (A) a plurality of sets of angularly spaced vane pistons successively arrayed in the annular chamber, each set having at least two vane pistons secured to a support member,
   (B) an intake port and an exhaust port opening into the annular chamber at successive angularly spaced positions along the direction vane piston movement,
   (C) means in the periphery of the annular chamber forming a concavely recessed firing chamber at a point between the intake port and the exhaust port,
   (D) fuel injection means connected to the firing chamber,
   (E) a compressed gas delivery conduit opening into the annular chamber at a point between the intake port and the firing chamber,
   (F) an adjustable compressed gas delivery check valve interposed in the conduit near its connection to the annular chamber,
   (G) and drive mechanism in the housing connected to control the acceleration and deceleration of the vane pistons in a manner decelerating them successively as they move from the intake port toward the firing chamber and accelerating them successively as they move from the firing chamber toward the exhaust port,
whereby intake gas being compressed between approaching vane pistons causes the check valve to open, delivering a portion of the gas compressed by the device into the delivery conduit, while assuring that the gas remaining between the approaching vane pistons is delivered to the firing chamber at a preselected minimum firing pressure determined by adjustment of the check valve, providing a self-powered gas generator for supplying compressed gas at a pre-determined delivery pressure to compressed gas driven devices.

2. The rotary piston device defined in claim 1, further including a compressed gas by-pass conduit connected to conduct a portion of the compressed gas from the delivery conduit around the firing chamber and to return it into the annular chamber at a point between the firing chamber and the exhaust port, whereby said portion of the compressed gas cools the annular chamber while supplementing the ignited charge in driving the rotating vane piston moving toward the exhaust port.

3. The rotary piston device defined in claim 1, further including in combination therewith at least one compressed gas-powered rotary torque-producing device having an intake port connected to the compressed gas delivery conduit.

4. The combination defined in claim 3, further including second fuel injection means and ignition means interposed in the compressed gas delivery conduit whereby the temperature and pressure of the gas delivered therethrough may be regulated.

5. The combination defined in claim 4, further including temperature-responsive sensor means:
   (A) exposed to exhaust gas expelled from the gas-powered rotary torque-producing device, and
   (B) operatively connected to control the introduction and ignition of fuel by the second fuel injection means in the conduit.

6. The rotary piston device defined in claim 1, wherein four sets each incorporating four individual vane pistons are arrayed in the annular chamber.

7. The combination defined in claim 3, wherein said torque producing device is a second alternately-accelerating rotary piston device.

8. The combination defined in claim 7, wherein the secone alternately-accelerating rotary piston device incorporates four sets each incorporating three individual vane pistons successively arrayed in an annular piston chamber.

9. The combination of alternately-accelerating rotary piston gas generator and torque-producing devices defined in claim 7, wherein each said rotary piston device incorporates:
 (A) a drive mechanism positioned entirely on one side of all vane piston sets in the device, including a captive connecting member mounted on a crankpin of a crankshaft and controlled in its rotation by ring gear means and connected by radially slidable pivotable bearings to each of the vane piston sets, and a floating connecting member also connected to each of the piston sets by radially slidable pivotable bearings but otherwise unpositioned,
 (B) a radially arrayed adjacent plurality of support members each integrally joined to all of the vane pistons of one vane piston set and provided with radial guideways cooperating with the radially slidable pivotable bearings on the connecting members, each support member being provided with a sealing ring assembly including at least two recessed grooves formed in the external periphery of said support member exposed to a radially adjacent surface on another support member or the cylindrical housing of the device, with resilient sealing rings being mounted in said recessed grooves cooperating with splash lubrication means supplying lubricant to the drive mechanism,
 (C) means forming lubricant delivery passageways connecting the engaging teeth of the captive connecting member and the cooperating ring gear means
  (1) with a lubricant sump positioned in the lower portion of the device below the drive mechanism and piston sets
  (2) and with the moving portions of the drive mechanism cooperating with drain passages communicating between the drive mechanism and the sump
 whereby recirculation of cooling lubricant from the sump through the drive mechanism is positively induced, and
 (D) wherein each second alternately accelerating rotary piston torque-producing device is provided with a valve assembly cooperatively juxtaposed with the periphery of an annular piston chamber therein, said valve assembly including a plurality of exhaust ports, a corresponding plurality of first auxiliary ports and a corresponding plurality of second auxiliary ports, all said ports communicating with the interior of the annular chamber, and a shiftable valve member cooperatively interconnected with the exhaust ports and with both sets of auxiliary ports, said valve member being movable between two operating mode positions in each of which positions one set of auxiliary ports is connected to the compressed gas delivery conduit while the other set of auxiliary ports is disconnected therefrom.

References Cited

UNITED STATES PATENTS

| | | | |
|---|---|---|---|
| 1,497,481 | 6/1924 | Bullington | 123—11 |
| 1,726,461 | 8/1929 | Weed | 123—11 |
| 2,544,481 | 3/1951 | Bancroft | 103—29 |
| 2,852,007 | 9/1958 | Bancroft | 123—11 |

CARLTON R. CROYLE, Primary Examiner

U.S. Cl. X.R.

123—11; 230—144; 418—36; 103—129

Our File 261-003

UNITED STATES PATENT OFFICE
CERTIFICATE OF CORRECTION

Patent No. 3,555,813          Dated January 19, 1971

Inventor(s)    Charles Bancroft

It is certified that error appears in the above-identified patent and that said Letters Patent are hereby corrected as shown below:

Column 4, Line 13, change "preferably" to --preferable--
Column 5, Line 15, change "txial" to --axial--
Column 9, Line 66, change "anges" to --flanges--
Column 14, Line 29, change "182" to --162--
Column 18, Line 3, delete "This assembly in the lower portion of FIGS. 8, 10, 11 and 12"
Column 18, Line 53-54, change "portoin" to --portion--
Column 18, Line 70, change "138" to --137--
Column 19, Line 12, after "point" add --between--
Column 21, Line 15, change "plane" to --plate--
Column 21, Line 29, change "operaton" to --operation--
Column 21, Line 46, change "refrence" to --reference--
Column 21, Line 49, after "vane" insert --piston--
Column 21, Line 62, after "intake" insert --compression--
Column 22, Line 36, change "invidual" to --individual--
Column 22, Line 43, change "righ" to --right--
Column 24, Line 18, after "into" insert --touching--
Column 25, Line 6, change "ue" to --use--
Column 28, Line 5, change "unbalancel" to --unbalanced--
Column 28, Line 6, change "unbalanaced" to --unbalanced--
Column 28, Line 40, change "41bc" to --41b--
Column 28, Line 48, change "appeaing" to --appearing--

Column 30, Line 75, change "in the" to --into--
Column 31, Line 4, cancel "the"
Column 33, Line 8, change "one" to --ond--

Signed and sealed this 14th day of September 1971.

(SEAL)
Attest:

EDWARD M. FLETCHER, JR.
Attesting Officer

ROBERT GOTTSCHALK
Acting Commissioner of Pate